United States Patent
Schorey et al.

(10) Patent No.: US 11,853,478 B2
(45) Date of Patent: Dec. 26, 2023

(54) MULTI-MODAL SWITCHING CONTROLLER FOR COMMUNICATION AND CONTROL

(71) Applicant: Control Bionics Limited, Camberwell (AU)

(72) Inventors: James E. Schorey, Milford, OH (US); Peter S. Ford, Sydney (AU)

(73) Assignee: Control Bionics Limited, Camberwell (AU)

( * ) Notice: Subject to any disclaimer, the term of this patent is extended or adjusted under 35 U.S.C. 154(b) by 0 days.

(21) Appl. No.: 18/006,406

(22) PCT Filed: Jul. 23, 2021

(86) PCT No.: PCT/US2021/043072
§ 371 (c)(1),
(2) Date: Jan. 23, 2023

(87) PCT Pub. No.: WO2022/020778
PCT Pub. Date: Jan. 27, 2022

(65) Prior Publication Data
US 2023/0266824 A1 Aug. 24, 2023

Related U.S. Application Data

(60) Provisional application No. 63/055,571, filed on Jul. 23, 2020.

(51) Int. Cl.
*G06F 3/01* (2006.01)
*G06F 3/02* (2006.01)

(52) U.S. Cl.
CPC ............ *G06F 3/015* (2013.01); *G06F 3/0227* (2013.01)

(58) Field of Classification Search
CPC ........ G06F 3/015; G06F 3/0227; G06F 3/011; G06F 3/01; G06F 3/00; G06F 3/02
See application file for complete search history.

(56) References Cited

U.S. PATENT DOCUMENTS

| 10,070,799 | B2 | 9/2018 | Ang et al. |
| 2011/0248862 | A1 | 10/2011 | Budampati et al. |
| 2013/0337974 | A1 | 12/2013 | Yanev et al. |
| 2018/0153430 | A1 | 6/2018 | Ang et al. |
| 2018/0217709 | A1 | 8/2018 | Hotelling |
| 2019/0073605 | A1 | 3/2019 | Keller |
| 2019/0082996 | A1 | 3/2019 | Ang et al. |
| 2019/0104968 | A1 | 4/2019 | Fedele |
| 2019/0171348 | A1 | 6/2019 | Vishwakarma et al. |

*Primary Examiner* — Pegeman Karimi
(74) *Attorney, Agent, or Firm* — Jenei LLC

(57) ABSTRACT

A controller is communicatively coupled to the one or more user input devices, such as sensors or electrodes, a user interface device, and one or more switch-controlled devices. The controller presents a configuration user interface on the user interface device including selectable configurations for access modes. The controller assigns one or more of the user input devices according to a current selected configuration of an access mode. The controller detects a volitional user input corresponding to a change in a particular signal detected by a particular user input device. The controller identifies the user input based on the current selected configuration and the detected volitional user input and switches the switch-controlled device based on the detected user input. In one or more embodiments, the system includes one or more sensors for detection of movement, gestures, eye tracking or other input.

18 Claims, 11 Drawing Sheets

Multiplatform Communication and Control System (MCACS)
File  Edit  Help  Advanced User Interface Number of Buttons: ○ 1  ● 2  ○ 4  ○ 8

Scan Buttons ☐
Step Scan, Switch 2 ☐
Step Scan, Switch 1 Long Press ☐
Restart Scan at 'A' ☐
Scan speed (seconds): [3 ◆]
Multi-Switch ☒
A=Switch 1, B=Switch 1 Long Press ☐
C=Switch 2, S=Switch 2 Long Press ☐
Direct Select ☐

Button Labels
A [Play - Next]
B [Pause - Resume]
C [C]
D [D]

Button Graphics ☑
Audio w/ Press ☐
Audio Prompt ☐
Switch Jack Out ☑

MULTI-MODAL SWITCHING CONTROLLER FOR COMMUNICATION AND CONTROL

CROSS-REFERENCE TO RELATED APPLICATIONS

The present Application for Patent is a National Stage application filed under 35 U.S.C. § 371 of International Application No. PCT/US21/43072, filed on Jul. 23, 2021, which claims priority to U.S. Provisional Application No. 63/055,571 entitled "MULTI-MODAL SWITCHING CONTROLLER FOR COMMUNICATION AND CONTROL" filed Jul. 23, 2020, each of which is hereby expressly incorporated by reference herein.

BACKGROUND

1. Technical Field

The present disclosure generally relates to bioelectrical, mechanical, positional, and other switching systems having an artificial intelligent interface.

2. Description of the Related Art

An augmentative and alternative communication device (AACD) typically provides two methods of access: (i) direct select, which gives users a cursor or mouse pointer that can be positioned by means of a mouse, an eye tracker, or some similar device; and (ii) switch scanning, which provides the user a selection by an automatic or a user-induced method of advancing through all of the current choices. Selecting and activating a button or hotspot serves to initiate some assigned action (e.g., to speak a phrase or to switch a toy on or off). A lesser used method of selection within an AACD is one of "multi-switching." In this mode, a button press or keyboard press or some other activation method is assigned directly to an action. For example, repeatedly pressing "Button B" will cycle through a number of possible phrases, with the highlighted phrase spoken when Button A is pressed. There are a number of variations within this direct select, switch scanning, and multi-switching realm. The most notable "nuance" is to add "long press," where holding the activation (e.g., pressing and holding a switch) will result in an action that differs from the action of a short activation of that same switch.

Heretofore, AACDs have offered some subset of the activation methods described here. Too often, though, the introduction of the device results in an incomplete assessment session with the user, moving from adoption of an activation method to the attempted practical use of this activation method without adequate exploration of what access method best serves the user.

BRIEF SUMMARY OF THE INVENTION

In one aspect, the present disclosure provides systems, methods, and apparatuses (hereinafter the "system") that include monitoring a signal from a set of sensors placed on a user.

In another aspect, the present disclosure provides a system that includes a powerful new category of multiplatform communication and control system (MCACS) for enabling a user to control a device using multi-modal inputs to a user interface device using a controller that switches from on/off based on set parameters to control one of a wide variety of electronic devices. In one or more embodiments, the control device comprises an electromyography (EMG) sensor. In another embodiment, the control device comprises (a) an electromyography (EMG) sensor and (b) an accelerometer. In one or more embodiments, a control device can utilize just one of the sensors.

In one aspect, one or more discrete input devices are used to provide a switch input signal to a controller, which can then send an output signal to a coupled user device (e.g., the Xbox One®, the PlayStation®, the Nintendo Switch®, and/or other types of gaming consoles) to trigger or activate a designated function of the user device.

In one aspect, the one or more electromyography (EMG) assistive technology devices (e.g., a NeuroNode® device, Control Bionics, Inc., Milford, Ohio), according to one or more embodiments, is used to provide an input signal to a controller, which can then send an output signal to a coupled user device (e.g., the Xbox One®, the PlayStation®, the Nintendo Switch®, and/or the other types of gaming console) to trigger or activate a designated function of the user device.

In another aspect, the multiplatform communication and control system has an emphasis on control as it provides leverage to the user. That is, the multiplatform communication and control system provides the ability to create many switch outputs from a single switch input, which makes the system powerful and unique.

In another aspect, the multiplatform communication and control system proves an input-output ability on its own, wherein switches can be re-routed. For example, at one moment the user, playing a video game e.g., Xbox pinball, using the EMG device through the control system, can actuate the flippers of the game, and the next moment the user can shoot out a new ball routed through a different Xbox control—all while using the same EMG activation switch.

In another aspect, other switch adaptations allow disabled users to control a subset of a dining robot, a game or a controlled wheelchair. The control system, through its use of context and completely user-programmable control system panels, allows the user to move, dine, or play an Xbox game in its entirety, or move from Grid 3 speech generation on a Trilogy to complete control of an iPhone or iPad—all without caregiver assistance.

In another aspect, the control system is a USB-connected device with an accompanying software application (App) that runs on an operating system such as Windows 10 or Mac OSX 11.

In another aspect, there can be multiple versions of the control system: switches only (e.g., 4 or 8 outputs); switches+RFID reader, switches+HID module or switches+RFID reader+HID module.

In another aspect, there are eight programmable wired switch outputs, scalable to 16 with the addition of a second control system. The few AT products in this space typically have one or two. This provides great utility in toy control, robotics control, and advanced gaming.

In another aspect, the system allows immediate selection among the three access methods (and variations of these). That is, the "Cause" (the access method) can be changed in seconds while keeping the "Effect" (e.g., animation of toys, control of an Xbox) constant.

In another aspect, the panels can be linked by context. For example, if the client is using a feeding robot with control system and hasn't invoked the feeding robot in some user-settable time, the panel can automatically switch to some higher-level panel to allow for communication related to the task at hand: "I am finished" or "more, please."

In another aspect, the panels can be switched by user control and with RFID cards (the size of a credit card). With this feature, a swipe of a card creates a control system ecosystem for dining, or an Xbox interface, or any number of aids for learning, activities of daily living, or game playing. Other "context" can be designed into the panel transitions, so the control system can be programmed to anticipate and invoke the next panel.

In another aspect, the communication and control can be managed from a control system App. It is possible, for example, to go from Obi Dining to Xbox gaming to speaking with Grid 3 to controlling an iPhone thru Switch Control, all without requiring caregiver intervention.

In another aspect, the USB-connected control system provides the clinician and user a full complement of access methods, switchable on the fly and "mix and matchable" from one communication and control panel to the next. The access method can change with every context-triggered transition, matching the best access method to the task at hand.

In another aspect, the control system was developed to allow some number of switch outputs to be reallocated as switch inputs.

In another aspect, RFID card reading is fully implemented in the control system App, and the circuit board is designed to accommodate the card reader (in place of the HID module). The swipe surface of the reader is positioned close enough to the inside top of the enclosure to allow consistent reading of a card swiped over the enclosure.

In another aspect, the IR control is utilized as one of the control system output choices. This gives the user the ability to control TVs and the many other devices that use remote control IR (infrared). In another aspect, an Internet of Things (IoT) IR module may be used, which is controlled by the control system over a Wi-Fi network.

In another aspect, inter-windows messaging code in the control system application allows the control system to control other Apps and allow other Apps to provide context to the control system (e.g., prompt the control system to act on some external event such as a room temperature limit exceeded).

In another aspect, the present disclosure illustrates various techniques and configurations to enable a series of dynamic workflows for the selection and presentation of content from an information system relevant to activities of a human user. The dynamic workflows used with the user input device as described herein enable the integration of user interfaces and user communication platforms to achieve relevant and timely communication among users and others and related actions. The dynamic workflows described herein further may be integrated with social networks and portable communication mediums to provide additional availability and delivery of content to users in a variety of settings.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 7 is a screen shot of the user interface device that enables configuring an effect of the multiplatform communication and control system of FIG. 1 to a dual control of the animatronic story-reading plush toy, according to one or more embodiments;

DETAILED DESCRIPTION

Definitions

Figure 1:
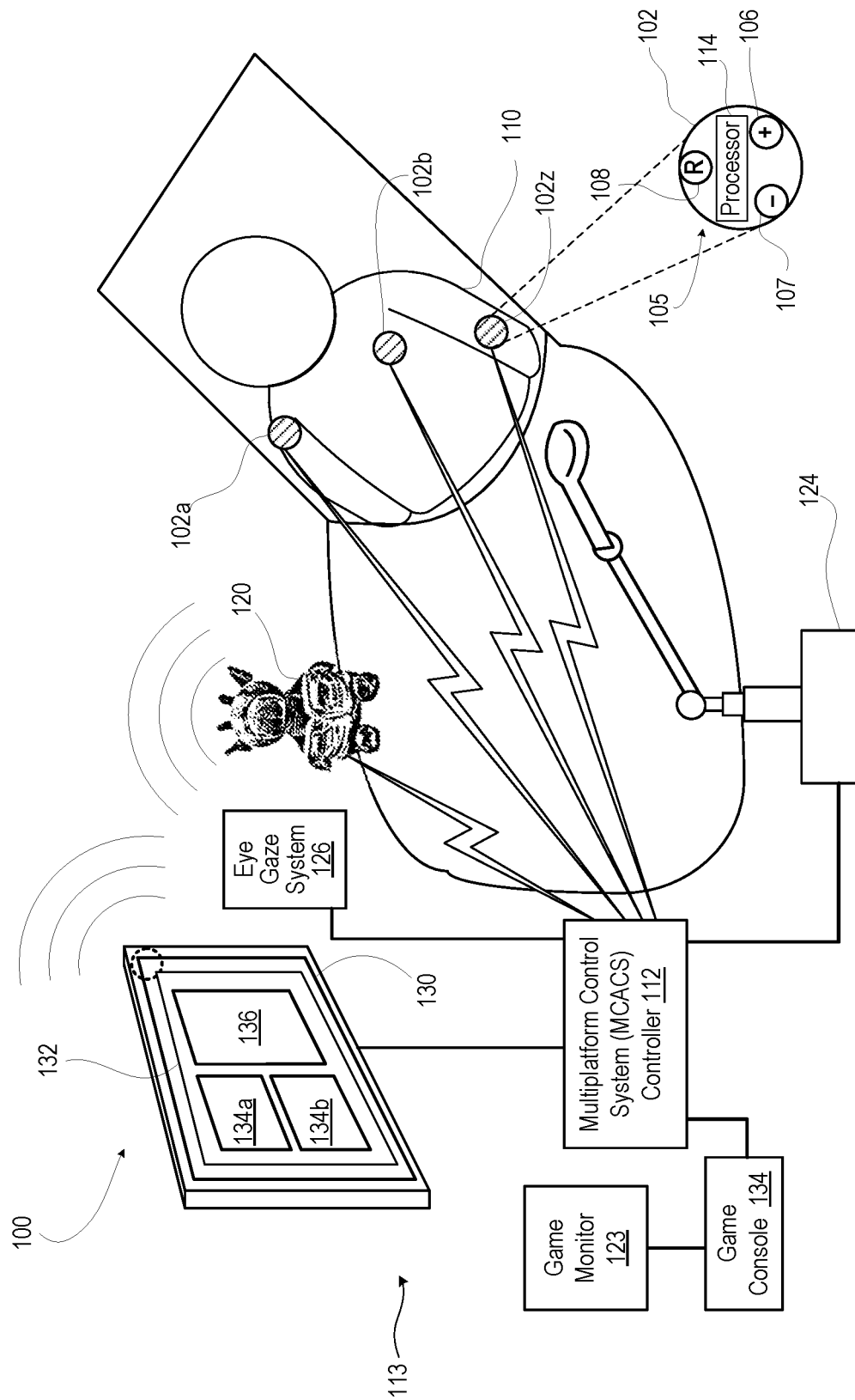
FIG. 1 illustrates a diagram of a user and a multiplatform communication and control system (MCACS) for enabling a user to control a device using multi-modal inputs to a user interface device using multiple user input devices, e.g., electromyography (EMG) assistive technology devices, according to one or more embodiments.

Embodiments described below in context of the user input devices are analogously valid for the respective methods, and vice versa. Furthermore, it will be understood that the embodiments described below may be combined, for example, a part of one embodiment may be combined with a part of another embodiment.

It should be understood that the terms "on", "over", "top", "bottom", "down", "side", "back", "left", "right", "front", "lateral", "side", "up", "down" etc., when used in the following description are used for convenience and to aid understanding of relative positions or directions, and not intended to limit the orientation of any device, or structure or any part of any device or structure. In addition, the singular terms "a", "an", and "the" include plural references unless context clearly indicates otherwise. Similarly, the word "or" is intended to include "and" unless the context clearly indicates otherwise.

The term "activation" as used herein refers to activation of one or more of the components using an input signal from an input device, user input device, or other component capable of initiating a signal.

As utilized herein, the terms "component," "computer component," "system," "client" and the like are intended to refer to a computer-related entity, either hardware, software (e.g., in execution), firmware, or a combination thereof.

Throughout this disclosure, the term "computer" describes hardware which generally implements functionality provided by digital computing technology, particularly computing functionality associated with microprocessors. The term "computer" is not intended to be limited to any specific type of computing device, but it is intended to be inclusive of all computational devices including, but not limited to: processing devices, microprocessors, personal computers, desktop computers, laptop computers, workstations, terminals, servers, clients, portable computers, handheld computers, smart phones, tablet computers, mobile devices, server farms, hardware appliances, minicomputers, mainframe computers, video game consoles, handheld video game products, and wearable computing devices including but not limited to eyewear, wristwear, pendants, and clip-on devices.

As used herein, a "computer" is necessarily an abstraction of the functionality provided by a single computer device outfitted with the hardware and accessories typical of computers in a particular role. It is also well known to those of ordinary skill in the art that the functionality of a single computer may be distributed across a number of individual machines. This distribution may be functional, as where specific machines perform specific tasks; or, balanced, as where each machine is capable of performing most or all functions of any other machine and is assigned tasks based on its available resources at a point in time. Thus, the term "computer" as used herein, can refer to a single, standalone, self-contained device or to a plurality of machines working together or independently, including without limitation: a network server farm, "cloud" computing system, software-as-a-service, or other distributed or collaborative computer networks. Those of ordinary skill in the art also appreciate that some devices which are not conventionally thought of as "computers" nevertheless exhibit the characteristics of a "computer" in certain contexts. Where such a device is performing the functions of a "computer" as described herein, the term "computer" includes such devices to that extent. Devices of this type include but are not limited to: network hardware, print servers, file servers, NAS and SAN, load balancers, and any other hardware capable of interacting with the systems and methods described herein in the matter of a conventional "computer."

The term "controller" as used herein indicates a method, process, or computer component adapted to affect a user device (i.e., the system to be controlled or effected).

The term "coupled" (or "connected") herein may be understood as electrically coupled or as mechanically coupled, for example attached or fixed, or just in contact without any fixation, and it will be understood that both direct coupling or indirect coupling (in other words: coupling without direct contact) may be provided.

As used herein, the term "electrode" means an operable connection to a muscle or nerve that allows an electrical potential so to be recorded or applied. An electrode can be further described by its location, i.e., internal, external or percutaneous; electrical or other recording characteristics, i.e., unipolar, bipolar, laptacian, magnetic or optical; and with respect to internal electrodes by its placement, i.e., intramuscular, epimysial, or nerve.

The term "electronic device" is used to designate any devices that can have a microprocessor and that can be communicated with. A microprocessor can include one or more processors, memory and programmable input/output peripherals. A controller can include one or more microprocessors and/or memory with instructions that can help control or communicate with electronic devices.

As used herein, when the term "function" is used to describe a relationship between one variable or parameter and a second variable or parameter, the relationship so described is not considered to be an exclusive relationship unless expressly stated, rather the other variables or parameters that are not mentioned or described but that are known to those of ordinary skill in the art may also have a functional relationship to the second variable or parameter. By way of example, if x is described as a function of y the statement is not intended to limit x's value to only being described by y unless expressly stated, rather the variable x may also be a function of other variables (e.g., $x=f(y, t)$).

The term "processor" is generally understood to refer to a hardware component, such as a processing unit of a computer system.

The term "sensor," as used herein, refers to a converter or instrument that measures a physical quantity or quality and converts the measurement into electrical signals which can be read, observed, stored, and/or understood by an observer or by another instrument. A sensor may comprise electrodes and associated sensor electronics integrated into a common structure such as an electrode pad or may comprise electrodes and sensor electronics that are disposed remotely from one another, such as electrodes coupled to a remotely positioned processor (e.g., positioned at another location on a user or garment) or other circuitry using an electrically conductive structure such as a conductive trace, wire, cable, or the like, for example. Biopotential sensors may include but are not limited to electromyography (EMG) sensors, ECG sensors, respiration, galvanic skin response (GSR), or others. Other types of sensors may also be incorporated into the devices described herein. These sensors may include but are not limited to accelerometers (single or multi-axis), GPS sensors, galvanic skin response (GSR), bioimpedance, gyroscopes, bend-angle measurement (flex) sensors (to measure joint angle or joint angles), etc.

As used herein, the terms "signal" may take the form of an electromagnetic or electrical current that carries data from one system or network to another. In electronics, a signal is often a time-varying voltage that is also an electromagnetic wave carrying information, though it can take on other forms, such as current. In one or more embodiments, this can imply a signal over a wire-based communication, e.g. using Universal Serial Bus (USB), Ethernet, a serial interface (such as RS-232, RS-485, etc.), a parallel interface (such as Centronics) or even a simple electric connection or alternatively a wireless interface.

The term "state" as used herein refers to how a computer program stores data in variables, which represent storage locations in the computer's memory. The contents of these memory locations, at any given point in the program's execution, is called the program's state.

The term "switch" as used herein means a system element that logically connects two or more ports to allow data units to be routed from one port to another. In one or more embodiments, the switch may include a number of ports, which are physical interfaces between the buffer and logic and the end points.

The term "user input device" as used herein is intended to have a broad definition and encompasses many variations on well-known input devices, which are capable of detecting user input from a user. The user input device can, for example, be a key, button, keyboard, mouse button, touch-pad button, etc. In one or more embodiments, the user input device may be a sensor or other input device capable of transmitting a system trigger or user input.

The term "wireless communication device" as used herein includes a receiver, a transmitter, a transceiver, a transmitter-receiver, and contemplates any device or devices, separate or combined, capable of transmitting and/or receiving wireless communication signals, including shift signals or control, command or other signals related to some function of the component being controlled. The wireless communication signals used in the present invention can be radio frequency (RF) signals, ultra-wide band communication signals, or Bluetooth communications or any other type of signal suitable for wireless communications.

DETAILED DESCRIPTION OF EXEMPLARY EMBODIMENTS

The present innovation provides a controller that switches from on/off based on set parameters to control one of a wide variety of electronic devices. In one or more embodiments, the control device comprises (a) an electromyography (EMG) sensor and (b) an accelerometer. In one or more embodiments, a control device can utilize just one of the sensors.

In one or more embodiments, the multiplatform communication and control system (MCACS) controller receives data input from one or more sensors. One or more embodiments can utilize standard electrocardiogram (EKG) electrodes. The device can be in multiple pieces or a unitary product. The electrodes can be attached directly to the unit body, wirelessly coupled, or connected by electrical leads. Other sensors may be utilized in the system, such as a proximity sensor, photodetector, a Hall-effect sensor, a radio frequency identifier (RFID) sensor, a biomedical sensor (such as electromyography, a moisture sensor, a fluid sensor, a temperature sensor, an electrodermal activity sensor, a chemical presence sensor, a biological presence sensor, sound sensor, vibration sensor, and a pH level sensor), and a force sensor that may sense a mechanical force such as a pressure sensor or a flex sensor.

In one or more embodiments, the sensor can be an activity sensor, which generates a signal indicative of patient activity (e.g., patient movement or patient posture transitions). For example, an activity sensor may include one or more accelerometers, such as one or more single-axis, two-axis or three-axis accelerometers, capable of detecting static orientation or vectors in three-dimensions. An example accelerometer is a micro-electromechanical accelerometer. In other examples, an activity sensor may alternatively or additionally include one or more gyroscopes, pressure transducers, piezoelectric crystals, or other sensors that generate a signal that changes as a function of user activity.

In one or more embodiments, the volitional electrical potential is used by the controller as a logical control input. A logical control or triggering command resembles a digital logic or on/off signal. In the case of a volitional electrical potential, the on/off signal is tailored to change state upon the user applying the volitional electrical potential.

The present invention provides user interface concepts, principles and techniques that can be translated into software algorithms to provide a rich functionality, convenience, flexibility and ease-of-use to users. Further, the disclosed concepts/principles/techniques can lead to easier implementation of the gesture recognition algorithms. Note that these concepts, techniques and principles can be used with controllers described elsewhere as well as with any other devices that can track user's head/face/bodily motions, facial expressions and gestures to control or communicate with any electronic devices. Further, the UI concepts described herein can be used to not only control an electronic device distinct from the controller, but also the controller and/or the controlling system itself. For the purpose of simplicity, the rest of the document will use the term "controller" to include "controlling systems" as well. Further, it is also understood that controllers themselves can be electronic devices; therefore, any mention of "controlling/communicating with an electronic device" can also include controlling/communicating with the controller itself.

Embodiments of the disclosed technology provide reliable and fast communication of a human through an interface, which detects the intent of the user. Embodiments of the disclosed technology enable people with severe speech and motor impairments to interface with computer systems for the purpose of typing in order to establish and maintain seamless spontaneous communication with partners in face-to-face situations, as well as in remote environments such as Internet chat, email, or telephone (via text-to-speech). In addition, embodiments also enable the target population to access information available on the Internet through a computer. In an embodiment, healthy humans may also utilize the proposed interface for various purposes.

The systems and methods of the present invention are adaptable and, in some embodiments, can include additional sensors for multiple applications. In some embodiments, the systems and methods of the present invention can be integrated with, for example and not limited to, electro-oculogram (EOG), microphones, accelerometers, gyroscopes, miniature cameras, and flow and/or pressure sensors, as well as electropalatography, electromyography (EMG) and electroencephalography (EEG) electrode arrays for detecting tongue contact with the palate, muscle movement and/or activity, and brain activity.

In order that the invention may be readily understood and put into practical effect, various embodiments will now be described by way of examples and not limitations, and with reference to the figures.

According to aspects of the present disclosure, a multi-platform communication and control system enables a readily customizable user interface, such as an augmentative and alternative communication device (AACD), that provides a full complement of access methods for a clinician to trial with a user—often a person with a profound motor or cognitive disability. Notably, the user interface remains unchanged with the selection of a different access method. Therefore, it is easier for the clinician to gauge which method best serves the user. In other words, this determination is simplified because, while the "cause" is modified, the "effect" is held constant.

In one or more embodiments, a multiplatform communication and control system includes one or more user input devices such as sensors or biosignal electrodes attachable to a user. A controller is communicatively coupled to the one or more user input devices, a user interface device, and a switch-controlled device. The controller presents a configuration user interface on the user interface device including selectable configurations for access modes. The controller assigns one or more of the biosignal electrodes according to a current selected configuration of an access mode. The controller detects a volitional user input corresponding to a change in a particular signal detected by a particular biosignal electrode. The controller identifies the user input based on the current selected configuration and the detected volitional user input and switches the switch-controlled device based on the detected user input.

FIG. 1 is a three-dimensional diagram of a multiplatform communication and control system 100 that includes one or more electromyography (EMG) assistive technology devices 102a, 102b, and 102z for multi-modal inputs by user 104. In one or more embodiments, the electromyography (EMG) assistive technology devices 102a, 102b, and 102z (collectively "102") are described in greater detail in commonly-owned United States Patent Application Number US2019/0142349A1 to James E. Schorey, et al., published May 16, 2019 and entitled "ELECTROMYOGRAPHY (EMG) ASSISTIVE COMMUNICATIONS DEVICE WITH CONTEXT-SENSITIVE USER INTERFACE", the disclosure of which is hereby incorporated by reference in its entirety. The electromyography (EMG) assistive technology devices 102 enable automatically customizable and adaptable detection of volitional user bioelectrical inputs.

The electromyography (EMG) assistive technology devices 102 each include a set of bioelectrical electrodes 105 such as a first active electrode 106, a second active electrode 107 and a reference ("R") electrode 108 that are adhered to a user 110. In other embodiments, each electrode 106-108 is individually adhered to the user 110 and interfaced to a multiplatform communication and control system (MCACS) controller 112 that centrally performs the processing functions of each electromyography (EMG) assistive technology device 102. Each electromyography (EMG) assistive technology device 102 includes a processor 114 that supports dynamic and static adjustments to switching threshold that accommodate specific requirements of the user 110 as compared to other individuals or as compared to changing characteristics of the user 110. In one or more embodiments, each electromyography (EMG) assistive technology device 102 is a mesh accessible surface electromyography controller, wearable by a user 110, for capturing electromyography and electrocardiography data from certain muscles, including the heart. electromyography (EMG) assistive technology device 110 has the ability to store the data onboard for extended periods, and to send the data by Bluetooth or Wi-Fi or other wireless means to a receiver. The electromyography (EMG) assistive technology device 102 can analyze the data onboard or send data to a receiver for analysis by code or by a person. When analyzing the data onboard, the electromyography (EMG) assistive technology device 102 can assess certain intentions of the user 110. The electromyography (EMG) assistive technology device 102 monitors parameters and sensor systems and incorporates algorithms that continually adapt to abilities of the user 110.

The MCACS controller 112 is communicatively coupled, either wirelessly or wired, to the user input devices 102a, 102b, and 102z to detect the "cause". The MCACS controller 112 is communicatively coupled, either wirelessly or wired, to one or more user interface devices 113 to prompt the "effect", such as: (i) an electronically-controlled toy, e.g., an animatronic story-reading plush toy 120, a game console 134 that is connected to a game monitor 123, a feeding robot 124, and an eye gaze system 126. A system monitor 130 can be communicatively coupled to the MCACS controller 112. The system monitor 130 supports one or more of: (i) providing a user interface for configuring individual user input devices or electromyography (EMG) assistive technology devices 102; and (ii) a user interface 132 for configuring the "cause" handled by the MCACS controller 110. For example, the user interface 132 for control system software can graphically depict switches 134a — 134b that are actively assigned to user input devices 102a, 102b, and 102z in accordance with configuration settings 136.

In one or more embodiments, other types of switches such as mechanical, positional, and optical can be used instead of, or in addition to, biosignal-based switches.

In one or more embodiments, the multiplatform communication and control system 100 enables a mixture of switch capabilities on a given panel such as monitor 130. For example, two buttons of four could control a feeding robot and another two buttons could provide speech generation for matters related to feeding, say: "Fill up my food bowl." or "I've had enough." This hybrid button and switch configuration could also allow user-activated transitions among access methods, for example, to move from multi-Switch selection for controlling a feeding robot to a Switch Scanning arrangement to accommodate the greater number of buttons needed for communication related to activities of daily living. Some of these transitions could be timer dependent, so, for example, if no new button requests related to feeding took place over some programmable period, the multi-Switch communication and control panel would be replaced with a Switch Scanning Panel, with one of the choices on the Switch Scanning Panel to return to the Feeding Panel.

In one or more embodiments, the multiplatform communication and control system includes, or is interfaced to, one or more of: (i) an eye tracking device such as a Trilogy model of a Windows Surface computer; an Apple iPad; (iii) an Xbox adaptive controller; (iv) an Xbox game console; (v) one or more touchscreen displays; and (vi) Bluetooth speaker, which can enable beaming audio of button presses or allowing "conversations" by allowing clinicians to "answer" to button presses from the client patient.

Figure 2:
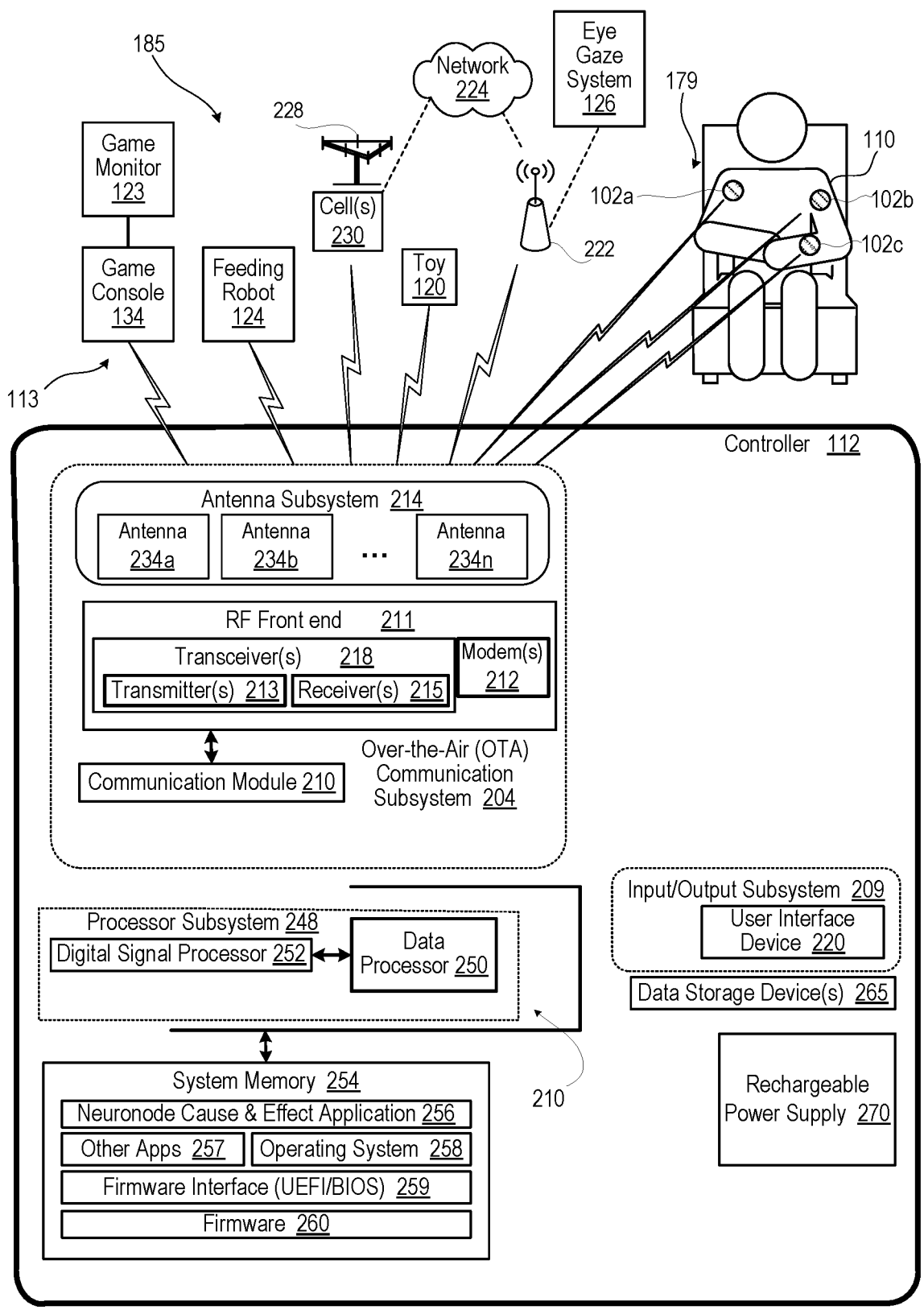
FIG. 2 illustrates a functional block diagram of a controller of the MCACS of FIG. 1, according to one or more embodiments.

FIG. 2 is a functional block diagram illustrating the MCACS controller 112 that performs the functionality of the cause-and-effect control of the system. The controller 112 includes over-the-air (OTA) communication subsystem 204 that communicates with user interface devices 113. Controller 112 provides computing and data storage functionality in support of OTA communication with user interface devices 113. Controller includes data storage subsystem 265 and input/output (I/O) subsystem 209 that are communicatively coupled to each other via a system interlink.

OTA communication subsystem 204 includes communication module 210 that operates in baseband to encode data for transmission and decodes received data, according to a predetermined communication protocol. OTA communication subsystem 204 includes radio frequency (RF) front end 211 having one or more modem(s) 212. Modem(s) 212 modulate baseband encoded data from communication module 210 onto a carrier signal to provide a transmit signal that is amplified by transmitter(s) 213. Modem(s) 212 demodulates the received signal from node 222 detected by antenna subsystem 214. The received signal is amplified and filtered by receiver(s) 215, which demodulate received encoded data from a received carrier signal.

Controller 112 controls the OTA communication subsystem 204, user interface device 220, and other functions and/or operations. These functions and/or operations include, but are not limited to, application data processing and signal processing. Controller 112 may use hardware component equivalents for application data processing and signal processing. For example, controller 112 may use special purpose hardware, dedicated processors, general purpose computers, microprocessor-based computers, micro-controllers, optical computers, analog computers, dedicated processors and/or dedicated hard wired logic. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (interlink 210) are illustrated in FIG. 2, it is to be understood that more, fewer, or different interconnections may be present in other embodiments.

In one or more embodiments, controller 112, via OTA communication subsystem 204, performs multiple types of OTA communication with external OTA communication system 265. OTA communication subsystem 204 can communicate with one or more personal access network (PAN) devices within external OTA communication system 265, such as smart watch, tablet or other portable device that is reached via Bluetooth connection. In one or more embodiments, OTA communication subsystem 204 communicates with one or more locally networked devices via a wireless local area network (WLAN) link provided by WLAN node 222. WLAN node 222 is in turn connected to wide area network 224, such as the Internet. In one or more embodiments, OTA communication subsystem 204 communicates with radio access network (RAN) 228 having respective base stations (BSs) or cells 230. RANs 228 are a part of a wireless wide area network (WWAN) that is connected to wide area network 224 and provides data services. In one or more embodiments, antenna subsystem 214 includes multiple antenna elements 234a-n that are individually tuned to selected RF bands to support different RF communication bands and protocols. Antenna elements 234a-n can be used in combination for multiple input multiple output (MIMO) operation for beam steering and spatial diversity.

Controller 112 includes processor subsystem 248, which executes program code to provide functionality of the multiplatform communication and control system 100. Processor subsystem 248 includes one or more central processing units (CPUs) ("data processor") 250. In one or more embodiments, processing subsystem 248 includes a digital signal processor (DSP) 252. Controller 112 includes system memory 254, which contains actively used program code and data. In one or more embodiments, system memory 254 includes therein a plurality of such program code and modules, including applications such as game application 256 and other applications 257. System memory 254 can also include operating system (OS) 258, firmware interface 259 such as basic input/output system (BIOS) or Uniform Extensible Firmware Interface (UEFI), and platform firmware 260. These software and/or firmware modules have varying functionality when their corresponding program code is executed by processor subsystem 248 or secondary processing devices within the multiplatform communication and control system 100.

Data storage subsystem 265 provides nonvolatile storage accessible to controller 112. For example, data storage subsystem 265 can provide a large selection of other applications 257 that can be loaded into system memory 254. I/O subsystem 209 includes input and output devices such as a user interface device 220. Power for multiplatform communication and control system 100 can be provided by a rechargeable power supply 270.

Figure 3:
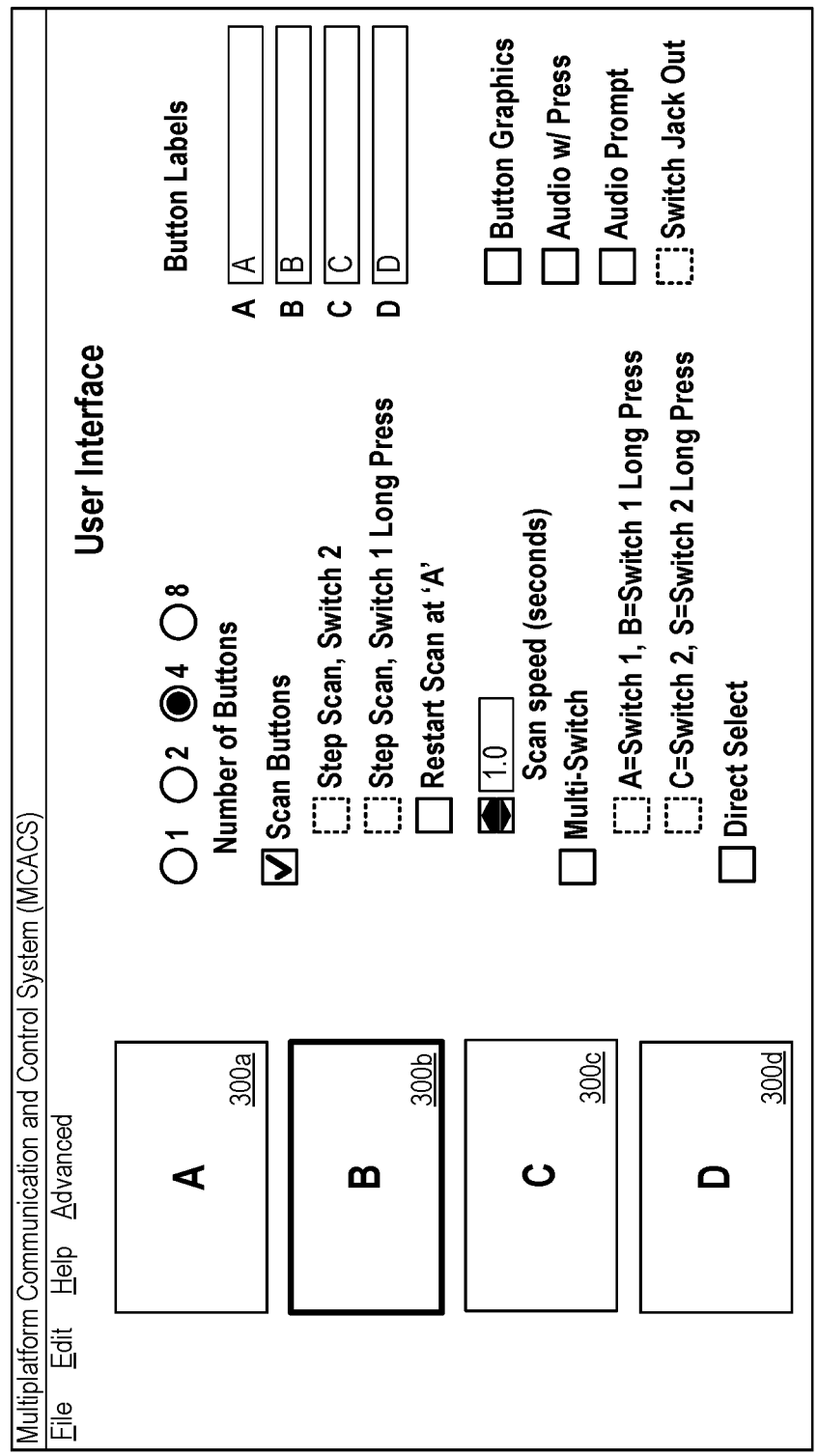
FIG. 3 is a screen shot of the user interface device that enables configuring an access mode for the multiplatform communication and control system of FIG. 1 to switch scan mode, according to one or more embodiments.

FIG. 3 is a screen shot of a user interface 132 that enables configuring access modes (i.e., the "cause"). In this example, a switch scan mode has been selected. The switch scan mode enables sequential automatic highlighting of each activation target 300a-300d. A user input by the corresponding user input device, e.g., electromyography (EMG) assistive technology device 102 (FIG. 1), activates the currently highlighted activation target 300b. Nuance can be added to this mode by allowing automatic (timed) scanning to be replaced by "step scanning," where advancement to the next target is made by either a second switch (when "Step Scan Switch 2" is chosen) or by a long press (when "Multi-Switch Long Press" is chosen).

Figure 4:
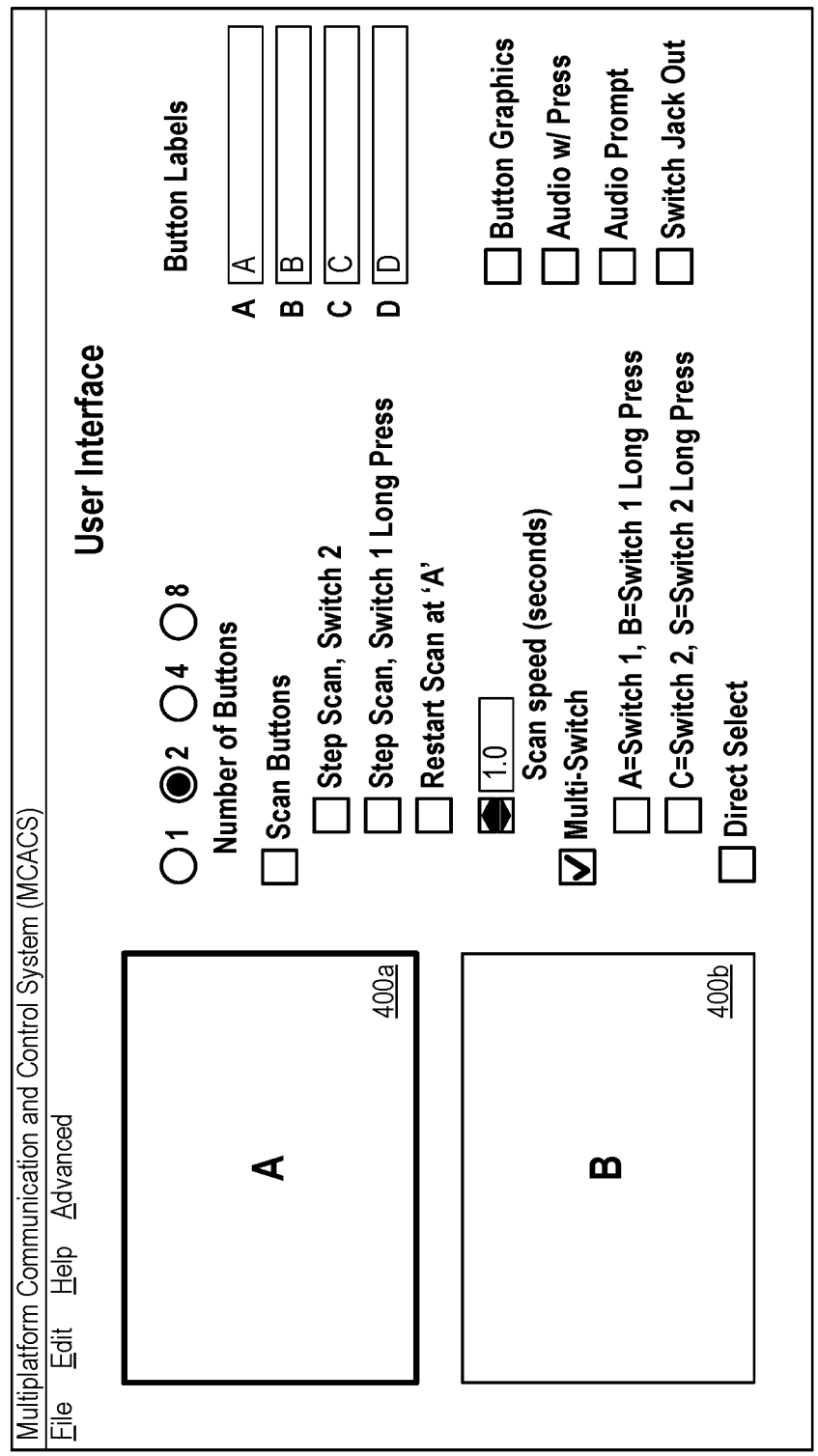
FIG. 4 is a screen shot of the user interface device that enables configuring access modes for the multiplatform communication and control system of FIG. 1 to direct switch mode, according to one or more embodiments.

FIG. 4 is a screen shot of a user interface 142 that is configured for the access mode of multi-switch, which in this instance includes switches or activation targets 400a-400b. Selection of the target activation 400a-400b is instantaneous; that is, unlike the Switch Scanning Mode, the user does not have to wait for the target choice to be active. Instead, activating the switch associated with its assigned target will initiate that target's action immediately. Multi-Switch Mode in its basic configuration assigns one switch input, such as electromyography (EMG) assistive technology device 102a (FIG. 1), to one unique button (activation targets 400a). Unique sophistication in this mode is found with the ability to use the long press of a switch for the activation of another button. Thus, a short press of a button could activate the action assigned to Button A, and a long press of that same button could activate the assigned action for Button B. In one or more alternate embodiments, another switch input, such as electromyography (EMG) assistive technology device 102b (FIG. 1), is assigned to another unique button (activation target 400b). For example, a feeder robot can have multiple receptacles that contain different types of food. The user can select a receptacle with a particular switch interaction and then direct that a spoon move a spoonful of the selected food to a position reachable by the user.

Figure 5:
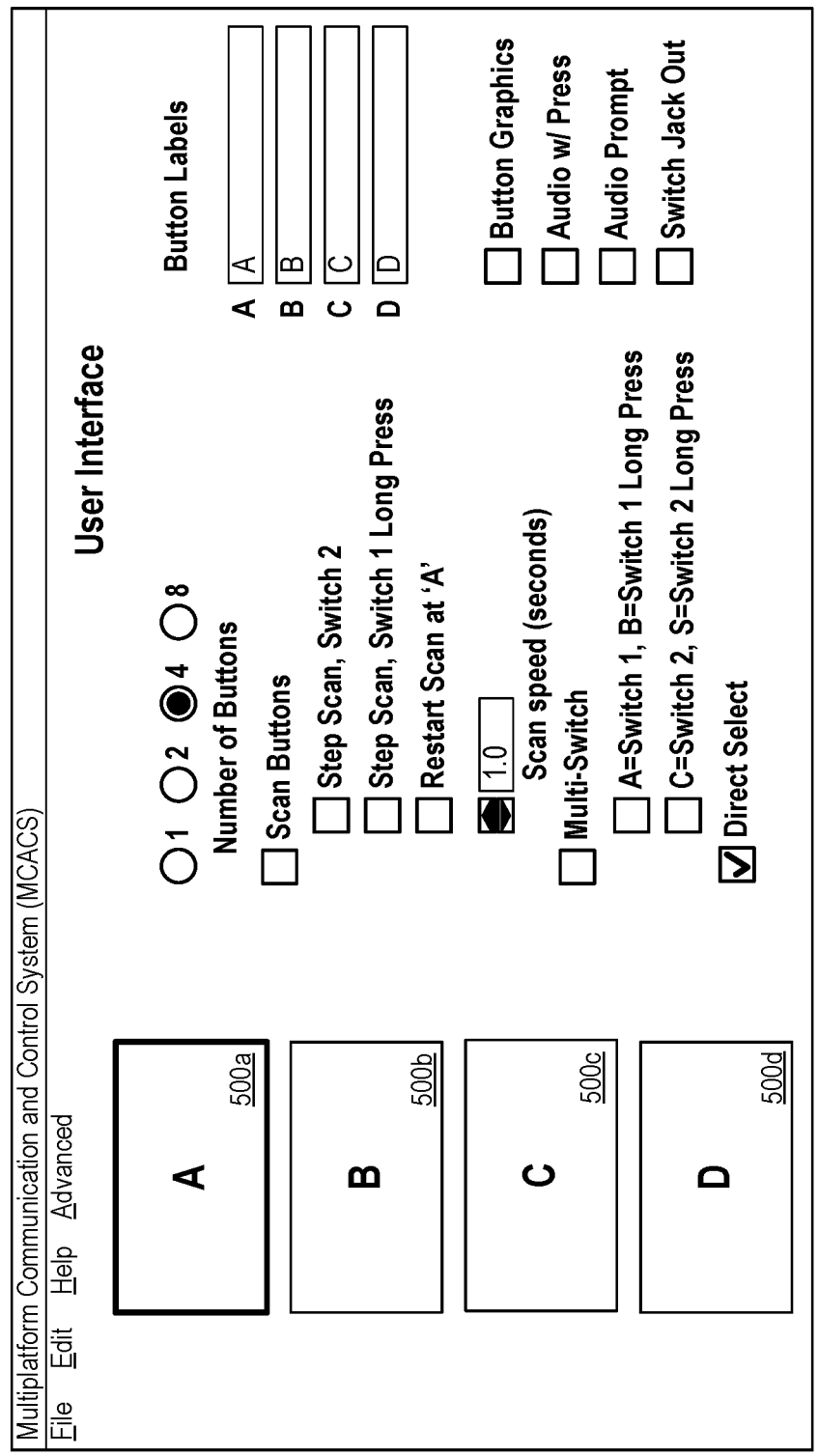
FIG. 5 is a screen shot of the user interface device that enables configuring access modes for the multiplatform communication and control system of FIG. 1 to direct select mode, according to one or more embodiments.

FIG. 5 is a screen shot of a user interface 152 that is configured for the access mode of direct select of buttons 500a-500d. Direct Select is what a typical computer user would find most relatable. In this mode, a method for positioning the cursor or mouse pointer is combined with some method of selecting the pointed-to selection (the Target).

Figure 6:
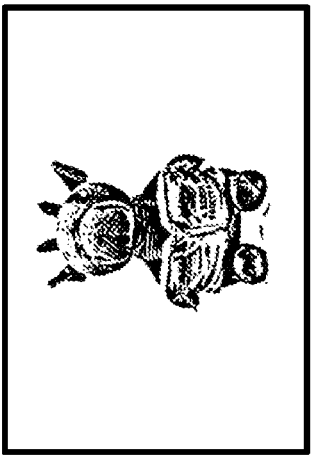
FIG. 6 is a screen shot of the user interface device that enables configuring an effect of the multiplatform communication and control system of FIG. 1 to a single on-off control of an animatronic story-reading plush toy, according to one or more embodiments.

FIG. 6 is a screen shot of a user interface 162 that is configured for direct control of an "effect", such as a single on-off control of the animatronic story-reading plush toy 120 (FIG. 1). For example, it is often the case that one of the most rewarding cause and effect configurations is a single switch activation that is tied directly to an adapted toy like Dalton the Storytelling Dragon. In this example, the "Switch Jack Out" field is checkmarked so when the user initiates an activation, Dalton will toggle between pausing and playing his story.

FIG. 7 is a screen shot of a user interface device 172 that is configured for direct control of an "effect", such as a dual control of the animatronic story-reading plush toy 120 (FIG. 1). For example, the Dalton the Dragon toy has two switch inputs, one for play/next story, and one for pause/resume. The example here allows both switch inputs to be controlled in Switch Scanning mode with button graphics that match the labels found on the toy.

Figure 8:
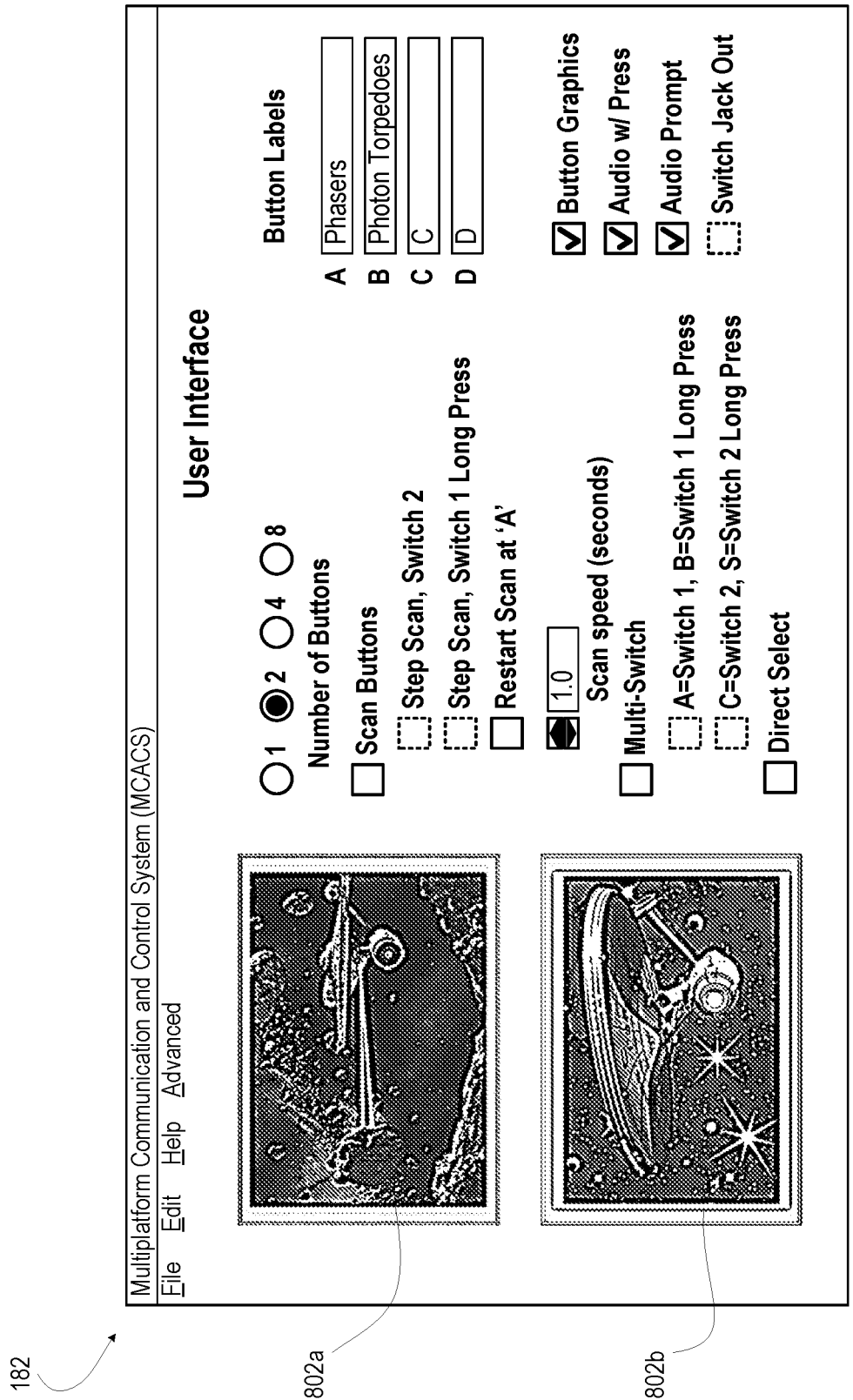
FIG. 8 is a screen shot of the user interface device that enables configuring an effect of the multiplatform communication and control system of FIG. 1 of an audio output, according to one or more embodiments.

FIG. 8 is a screen shot of a user interface 182 that is configured for direct control of an "effect" of an audio output. For example, A first button 802*a* can be assigned a first graphic and sound effects. A second button 802*b* can be assigned a second graphic and sound effect. Activating a particular switch 802*a*-802*b* when the button scan arrives at the desired choice gives the user instantaneous audio feedback, matching the target button graphic with the message/effect of the audio.

Figure 9:
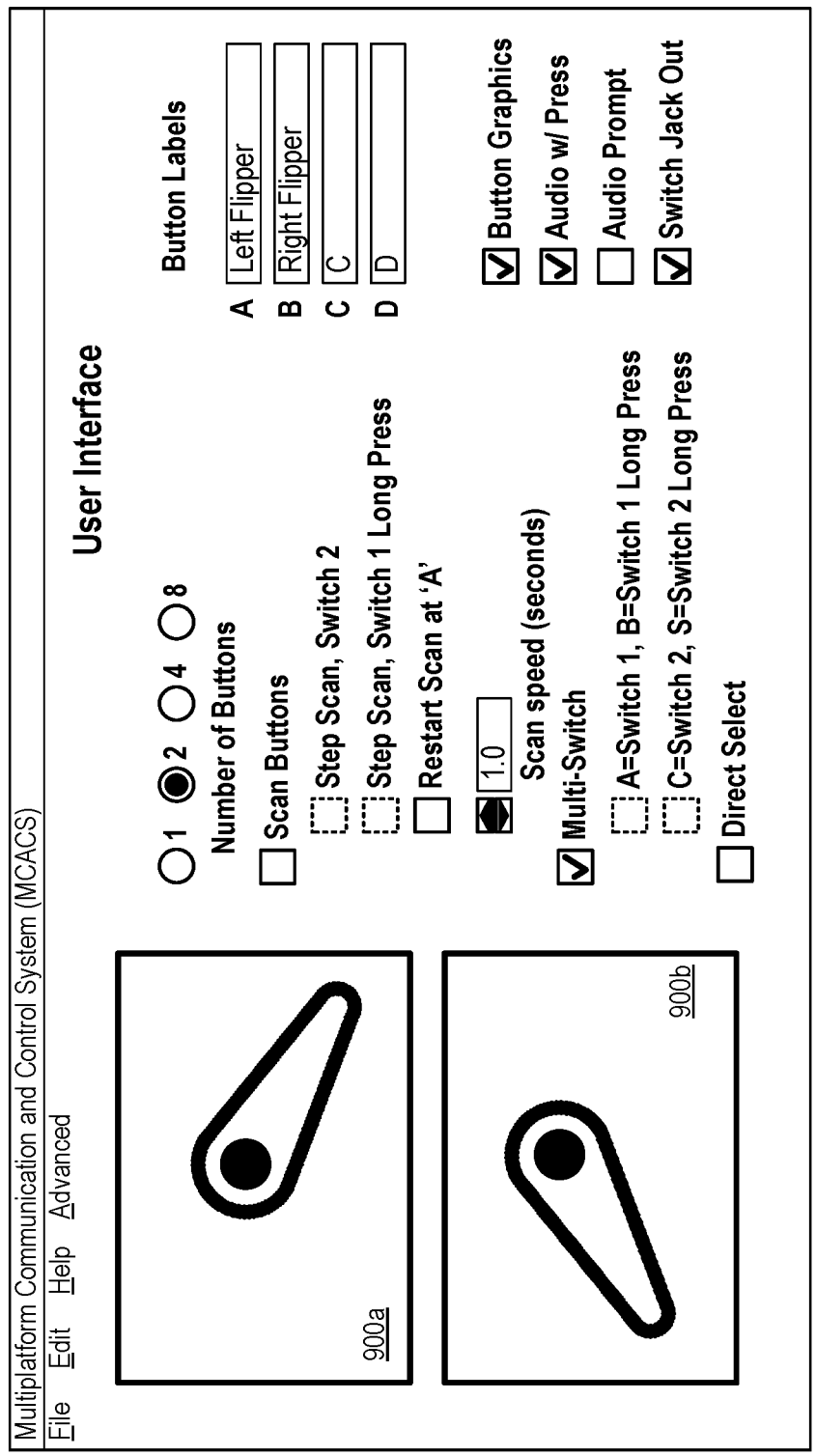
FIG. 9 is a screen shot of the user interface device that enables configuring an effect of the multiplatform communication and control system of FIG. 1 of direct control of flippers of a two-input pinball game, according to one or more embodiments.

FIG. 9 is a screen shot of a user interface 192 that is configured for direct control of an "effect" of flippers 900*a*-900*b* of a two-input game. For example, pinball in its many versions is a perfect match for the Multi-Switch Mode. Here, Switch 1 is set as the left flipper 900*a* and Switch 2 is set as the right flipper 900*b*. This mode allows for a switch to be "held," which in the case of a flipper keeps it energized to hold a ball in place. In one or more embodiments, additional switches can be assigned to launch the ball or to manage other game functions.

Figure 10:
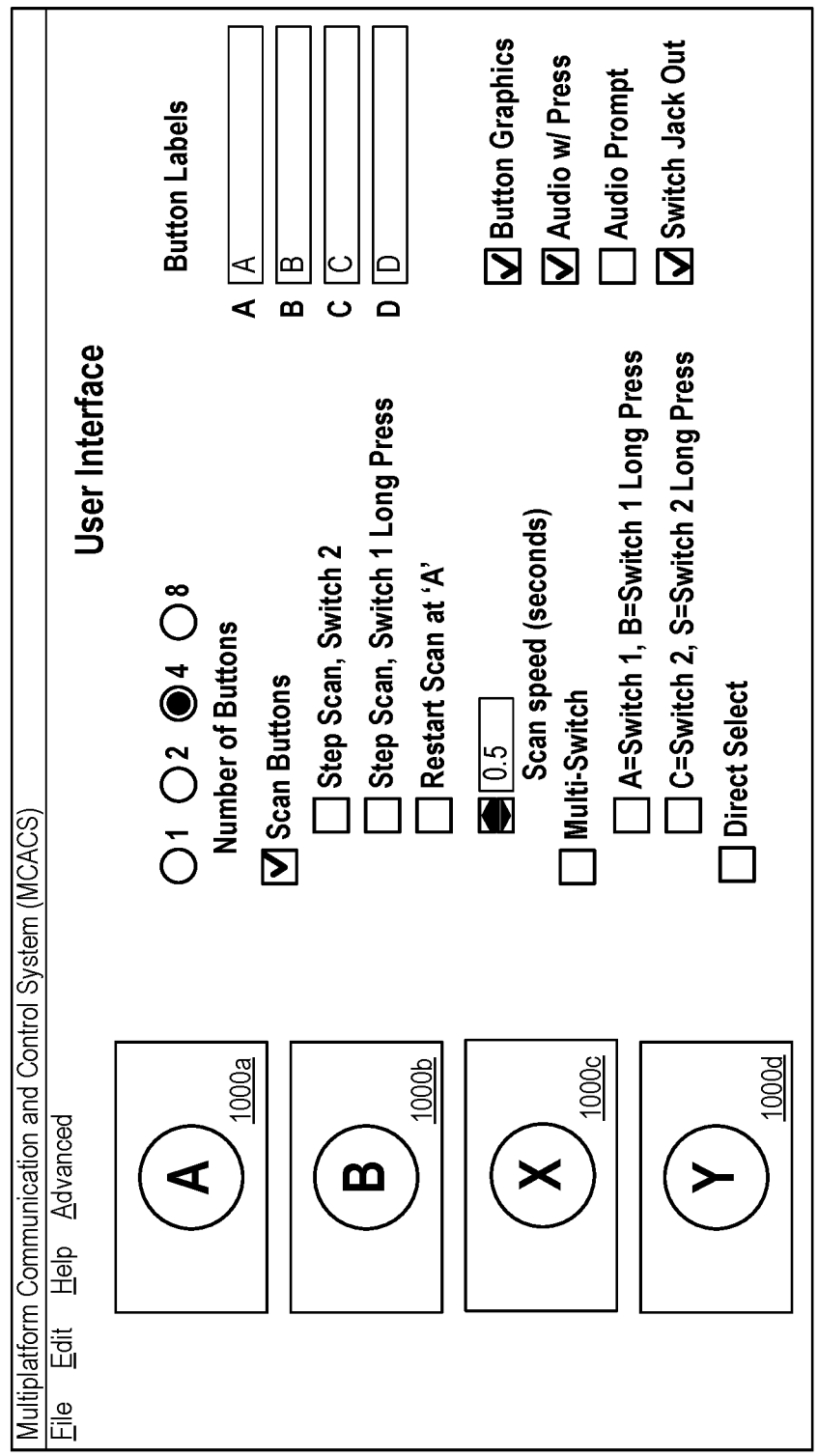
FIG. 10 is a screen shot of the user interface device that enables configuring an effect of the multiplatform communication and control system of FIG. 1 of direct control of a game controller of an advanced game console, according to one or more embodiments.

FIG. 10 is a screen shot of a user interface 202 that is configured for direct control of an "effect" of activating control buttons 1000*a*-1000*d* of a controller of an advanced game console. In one embodiment, the control buttons may correspond to the A, B, X, Y buttons of the Microsoft XBOX controller. Advanced gaming normally requires more than a single switch. Even when eye tracking within a game is a significant part of the immersive experience, the need often remains to take multiple actions, nearly simultaneously. In one or more embodiments, the multiplatform communication and control system 100 in its base configuration allows for up to eight or more separate switch outputs for game control (scalable to 16, 24 or more depending on the number of switched outputs). While this set of switch outputs can be activated with all three primary access methods, the most responsive game control is found with the Direct Select or Multi-Switch mode. If the user is limited to a single switch activation, fast scan times and short audio prompts are the key to making Switch Scanning useable from a gaming perspective.

Figure 11:
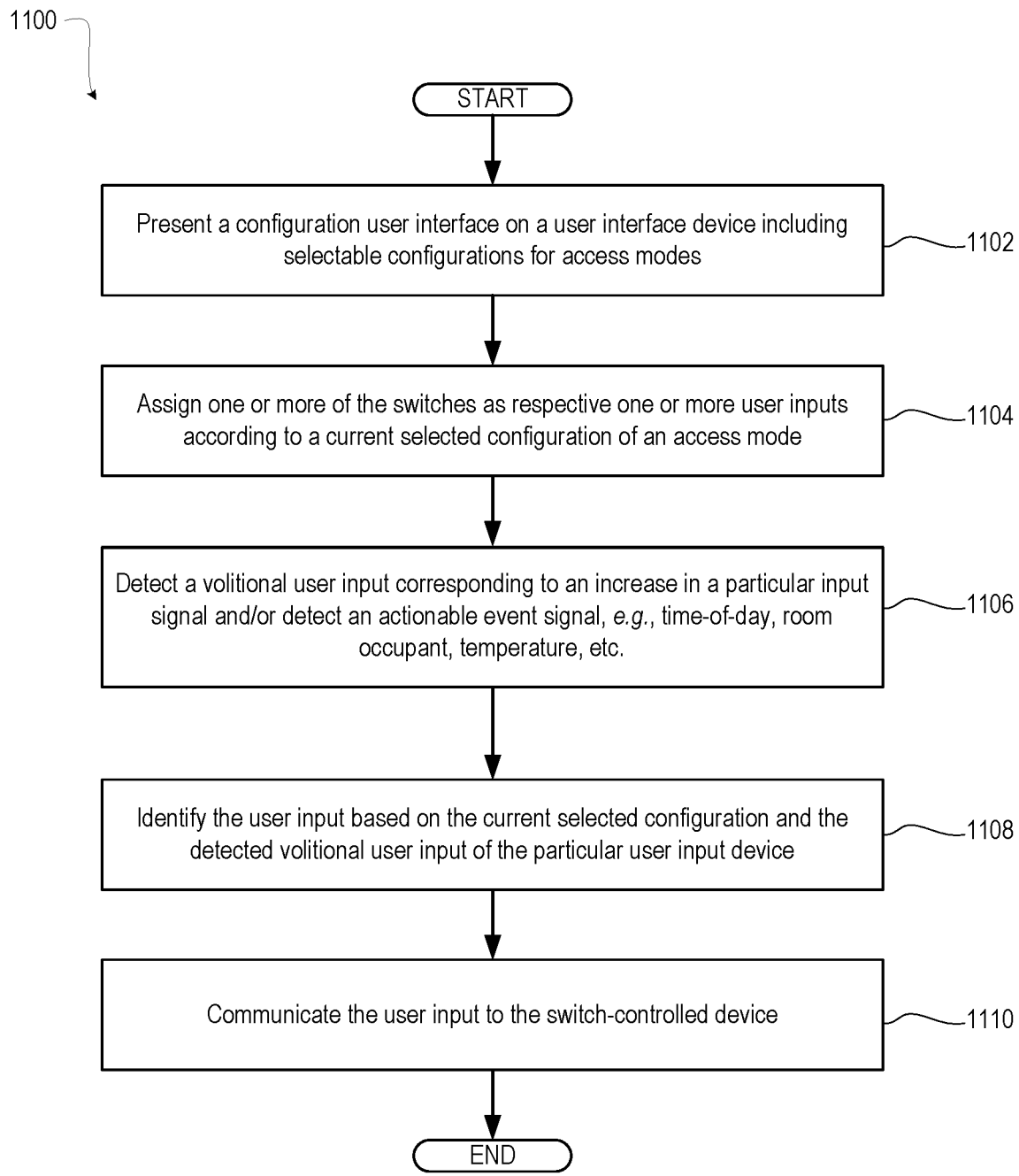
FIG. 11 presents a flow diagram of a method for assigning user input "causes" to switch-controlled device "effects", according to one or more embodiments.

FIG. 11 presents a flow diagram of a method for assigning user input "causes" to switch-controlled device "effects". Method 1100 includes presenting a configuration user interface on a user interface device including selectable configurations for access modes (block 1102). Method 1100 includes assigning one or more of the switches respectively as one or more user inputs according to a current selected configuration of an access mode (block 1104). Each switch is configured to be positioned on a user and comprising a set of user input devices such as sensors or electrodes configured to detect a signal from the user. Method 1100 includes detecting a volitional user input corresponding to an increase in a particular input signal detected by a particular user input device (block 1106). Method 1100 includes identifying the user input based on the current selected configuration and the detected volitional user input of the particular user input device (block 1108). Method 1100 includes communicating the user input to the switch-controlled device (block 1110). Then method 1100 ends.

In one or more embodiments, the access mode includes a first input of a first duration and a second input of a second duration of a first switch-controlled device, the first and the second durations being different. In one or more embodiments, the access mode includes selecting one of: (i) a time scan; and (ii) a step scan. In one or more embodiments, method 1100 includes assigning a first switch-controlled device to a first input of a user interface and assigning a second switch-controlled device to a second input of the switch-controlled device.

In one or more embodiments, method 1100 includes receiving a button quantity selection of one of: (i) one button; (ii) two buttons; and (iii) four buttons; and (iv) and eight buttons. Method 1100 includes mapping one or more unique switch inputs producible by the one or more switches to a number of buttons corresponding to the button quantity selection. In one or more particular embodiments, method 1100 includes determining that a first user input is received in response to detecting the first volitional user input to a particular switch having a first duration. Method 1100 includes determining that a second user input is received in response to detecting a second volitional user input to the particular switch having a second duration that is longer than the first duration.

The present disclosure includes various exemplary embodiments of systems and methods that utilize the location and context of a user and other resources to a) adjust to the current situation, b) prevent high risk situations, and/or c) respond to and manage situations. Various embodiments include collecting, aggregating, and analyzing user-related data specific to that user's condition, motivations, and usage. Such data/information can be collected from a wide variety of sensors and other data sources, including but not limited to: personal devices such as smartphones, tablets, computers, PDAs, wearables (data collection devices worn on the person, such as Fitbit, etc.), implants, Google GLASS, etc.; nearby sensors or devices such as security/video cameras, smart devices (such as smart home-related sensors, etc.), crowdsourcing data collection applications of nearby users, building/store/office Wi-Fi networks, location-sensitive beacons, etc.; and/or extended data collection mechanisms such as road traffic sensors, public video cameras or billboard displays, weather data collection sensors, law enforcement/security-related devices, etc.

In one or more embodiments, an example communications network includes a plurality of heterogeneous, differing, or different types of sensing devices configured to monitor the location and/or context of a user; and a plurality of heterogeneous, differing, or different types of interface devices each configured to engage in interaction with the user, with a support person for the user, and/or with a third party in the event that the network detects a relationship between the monitored location and/or context and a trigger predetermined in the network for the user; wherein the interaction is selected based on the trigger and the monitored location and/or context. The example communications network may include one or more server, client, cloud, peer-to-peer, and/or other devices configured to develop and/or update a profile of the user based on monitoring data from the sensing devices and/or the interaction engaged in by one or more of the interface devices.

The system can operate in a home, a nursing home, a hospital or other setting. In one or more embodiments, the system includes one or more mesh network appliances to enable wireless communication in the home monitoring system. Appliances in the mesh network can include home security monitoring devices, door alarm, window alarm, home temperature control devices, fire alarm devices, among others. Appliances in the mesh network can be one of multiple portable physiological transducer, such as a blood pressure monitor, heart rate monitor, weight scale, thermometer, spirometer, single or multiple lead electrocardiograph (ECG), a pulse oxymeter, a body fat monitor, a cholesterol monitor, a signal from a medicine cabinet, a signal from a drug container, a signal from a commonly used appliance such as a refrigerator/stove/oven/washer, or a signal from an exercise machine, such as a heart rate. In one example, a user may have mesh network appliances that detect window and door contacts, smoke detectors and motion sensors, video cameras, key chain control, temperature monitors, CO and other gas detectors, vibration sensors, and others. A user may have flood sensors and other detectors on a boat. A user may have access to a panic transmitter or other alarm transmitter. Other sensors and/or detectors may also be included.

An embodiment of the disclosed technology may comprise one or more of the following components: (1) rapid serial presentation of stimuli, such as visual presentation of linguistic components (e.g., letters, words, phrases, and the like) or non-linguistic components (e.g., symbols, images, and the sort), or other modalities such as audible presentation of sounds, optionally with individual adjustment of presentation rates, (2) a user intent detection mechanism that employs multichannel electroencephalography (EEG), electromyography (EMG), evoked-response potentials (ERP), input buttons, and/or other suitable response detection mechanisms that may reliably indicate the intent of the user, and (3) a sequence model, such as a natural language model, with a capability for accurate predictions of upcoming stimuli that the user intends in order to control the upcoming sequence of stimuli presented to the subject.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

A Bluetooth transceiver can be a Bluetooth semiconductor chip that can include Bluetooth Low Energy (BLE) capability to transmit and receive data and supports a mesh network of multiple EMG devices with one elected host to contact another device. Thus, each EMG device, or similar units configured for monitoring a bioelectrical signal, determines a hierarchy of data flow in which one assistive technology device becomes the central controller and passes all data to and from each of the other assistive technology device units in the mesh network. This enables a number of assistive technology device units to be attached to a user so that all data and instructions are efficiently channeled through a single unit to and from other devices or software. Outbound data: data sent from the assistive technology device or mesh network can be sent in Boolean format (0 or 1, i.e., OFF or ON) or dynamic format such as a data stream to control switching software or hardware, or variable software (such as a cursor through X and Y coordinates on a screen) or hardware (such as a robotic device).

Target systems include software (such as programs that can be controlled by Boolean or dynamic data, including Assistive Technology programs); hardware (such as robotic systems which may include control and response software); firmware (such as resident software that controls a device such as a television, music or video player or recorder, smartphone, tablet, computer, environmental control system); proximity systems such as a Near Field Communication (NFC) system; analytical systems, such as a cardiography or other data analysis systems, pattern recognition systems or other data-based system; and programmed or artificial intelligence systems. In one or more embodiments, the EMG device captures physiological data and stores, analyzes, transmits and uses the data and calculated results to display information, interface with other software and hardware systems, and control other devices.

The device may also include a variety of computer-readable media. Computer-readable media can be any available media that can be accessed by the CPU and can include both volatile and nonvolatile media that is either removable and/or non-removable, for storage of information such as computer-readable or computer-executable instructions, data structures, program modules, or other data. Computer-readable media includes computer storage media and communication media. Computer storage media refers to tangible computer-readable or machine-readable media or storage devices such as digital versatile disks (DVDs), Blu-ray discs (BD), compact discs (CDs), removable media or storage, tape drives, hard drives, optical drives, solid state memory devices, random access memory (RAM), read-only memory (ROM), electrically erasable programmable read-only memory (EEPROM), CD-ROM or other optical disk storage, smart cards, flash memory (e.g., card, stick, and solid state drive), magnetic cassettes, magnetic tapes, magnetic disk storage, magnetic strips, or other magnetic storage devices.

Retention of information such as computer-readable or computer-executable instructions, data structures, program modules, and the like, can also be accomplished by using any of a variety of the aforementioned communication media (as opposed to computer storage media) to encode one or more modulated data signals or carrier waves, or other transport mechanisms or communications protocols, and can include any wired or wireless information delivery mechanism. Note that the terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, and/or computer program products embodying some or all of the various wearable device implementations described herein, or portions thereof, may be stored, received, transmitted, or read from any desired combination of computer-readable or machine-readable media or storage devices and communication media in the form of computer-executable instructions or other data structures. Additionally, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, or media.

The device implementations described herein may be further described in the general context of computer-executable instructions, such as program modules, being executed by a computing device. Generally, program modules include routines, programs, objects, components, data structures, and the like, that perform particular tasks or implement particular abstract data types. The wearable device implementations may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Additionally, the aforementioned instructions may be implemented, in part or in whole, as hardware logic circuits, which may or may not include a processor.

Alternatively, or in addition, the functionality described herein can be performed, at least in part, by one or more hardware logic components. For example, and without limitation, illustrative types of hardware logic components that can be used include FPGAs, application-specific integrated circuits (ASICs), application-specific standard products (ASSPs), system-on-a-chip systems (SOCs), complex programmable logic devices (CPLDs), and so on.

In some embodiments, the subject is partially or completely disabled, such as for example a quadriplegic subject, and the apparatus provides for control of a user device that facilitates control of a disabled subject's environment so that the subject can be at least partially self-sufficient. For example, in some embodiments the user device is a personal computer, a wheelchair, a bed, a telephone, a home appliance, and/or a speech synthesizer. Exemplary user devices can include or be a mobile phone, a smartphone, a PDA, a computer, and a media player. A media player can include or be any device suitable for displaying images, and/or playing sounds and/or video. In some embodiments, the subject is in need of controlling a complex user device or is functioning in a difficult environment and can utilize the assistive device to control the user device or function in the environment. For example, the subject in some embodiments can be a pilot, driver, scuba diver, or soldier.

In one or more exemplary embodiments, scanning style can be configured with autoscanning selection, which moves the focus while scanning after a set duration. In one or more embodiments, manual scanning selection requires a switch to be made in order to move focus, and another switch to be made in order to select an item. Single switch scanning selection requires a switch to be made in order to move focus. If no action is taken after a set duration, the item with focus is automatically selected.

Auto scanning time is the number of seconds (for example, up to 5, 10, 15, 20, 25, 30 seconds or more) that are required to step from one item to another in a panel when using autoscanning style. Pause on first item selection is the number of seconds (for example, up to 2, 3, 4, 5, 6, 7, 8, 9, 10 seconds or more) that autoscanning stays on the first item in panel, group or user interface. Loops setting sets the number of times Switch Control repeats a scan. Tap behavior setting adjusts what happens when a switch activated to select an item. Default setting shows the scanner menu upon selecting an item. Auto tap setting automatically selects the item unless another switch is made during the set duration, at which time the scanner menu will appear. Always tap setting automatically select the highlighted item instead of showing the scanner menu. This setting only works while scanning in item mode and puts the scanner menu at the end of the scan. Focused item after tap setting determines where the scan restarts after an item is selected, either the "first item" (i.e., the beginning of the scan) or at the "current item." Ignore repeat setting is the number of seconds (for example, up to 6, 7, 8, 9, 10, 12, 14, 16 seconds or more) during which repeated pressing of a switch is ignored. Gliding cursor speed is the speed from "1" (slow) to "100" (fast) at which the gliding cursor moves across the screen. Use this setting to adjust the speed while in point mode. Speech setting turns on or off audio cues during scanning. Cursor color setting controls the color of the gliding cursor in point mode or the color of the grouped items in item mode.

Setting an accessibility shortcut provides a quick, efficient way to turn Switch Control on and off without entering the system settings. In order to create an accessibility shortcut, the accessibility settings are configured by enabling Switch Control as previously described. Then the accessibility shortcut setting is set to "Switch Control", allowing the user to turn Switch Control on and off by pressing the home button on and off three times in quick succession.

In one or more exemplary embodiments, guided access setting limits an iOS device to a single application and allows the user to control which application features are available. With guided access, the user is able to temporarily restrict an iOS device to a single application and, more importantly, to disable areas of the screen where an accidental gesture or selection may cause an unwanted action.

In one exemplary mode, from the iOS device home screen, the default Switch Control scanning mode is item mode. Item mode highlights items or groups on the screen one at a time. Point mode allows selection of an item on the screen by pinpointing it with scanning crosshairs. Changing from point mode to item mode includes adjusting the timing parameters within Switch Control tap behavior settings. Step 1: The default setting is auto tap set to 0.20 seconds that should be adjusted to 2.0 seconds. Step 2: scan to and select any item on the iOS device. Once an item is selected, make another switch with 2 seconds to display the scanner menu. Step 3: scan to and select item mode. If in item mode, scan to and select point mode. In order to increase overall speed, it may be helpful to return to Switch Control tap behavior.

The assistive technology device will also work with eye tracking devices (also referred to as eye gaze). Eye tracking is a technology that tracks the motion of the eye relative to the head. In a normal embodiment, the eye tracker will determine the user's intention by observing where the eyes are trained and then processing a 'Selection'. A Selection is the process of choosing what the eyes are trained on. Normally, a selection is made by maintaining the gaze in position for some predetermined time or by performing an eye closure. The assistive technology system can be used as the Selection mechanism as a replacement for standard Selection strategies. The assistive technology device for Selection can significantly increase the speed of eye tracking communication while significantly decreasing the user fatigue associated with other Selection method.

It should be understood that the invention's eye gaze user interface and method can be implemented on a wide variety of different types of eye gaze detection and virtual display devices, some head mounted, and some not. In some cases, the device may be head mounted, and in other case the device may not be head mounted. Some devices may only monitor the gaze direction of one of the user's eyes, while other devices may monitor the gaze direction of both of the user's eyes. The device will generally have a display upon which various visual targets, such as symbols, may be displayed in order to give the user something specific to gaze at. Although in this specification, generally such displays are shown as see-through virtual displays (because this type of display enables a user to see the surroundings beyond the virtual display), in some embodiments, the device utilizes a standard, non-see-through, type display.

The device may monitor eye gaze directions by many methods, including video cameras trained on the eye along with automated image analysis software that interprets eye gaze direction from the visual appearance of the eye. Alternately the device may monitor eye gaze direction by bouncing light off of the surface of the eye and noting the direction of the reflected beam or beams of light, or other means.

The device will typically be a computer operated device, often including at least one microprocessor, memory, and software to control the visual display. The device will generally take input from the eye gaze sensor or sensors and convert this input into an eye gaze direction, as well as correlate this eye gaze direction with a particular visible element and eye position zone associated with this particular visible element on the device's display. The device may additionally contain communication devices, such as wired or wireless network connections to communicate to and from other outside devices, cell phone networks, and networks such as the Internet. Note that although in some embodiments, this microprocessor and communication devices may be internal to a device that in turn is mounted on the user's head, in other embodiments, the device may be more of a dumb device, and microprocessor(s) and communications devices may instead be outside of the device, and in some cases connected to the device by a cable.

Contextual Embodiments

The present disclosure illustrates various techniques and configurations to enable a series of dynamic workflows for the selection and presentation of content from an information system relevant to activities of a human user. The dynamic workflows used with the assistive technology device as described herein enable the integration of user interfaces and user communication platforms to achieve relevant and timely communication among users and others and related actions. The dynamic workflows described herein further may be integrated with social networks and portable communication mediums, to provide additional availability and delivery of content to users in a variety of settings.

In one example, an internet-hosted information service is offered to users through a series of dynamically changing user interfaces. For example, a software application may be used to collect, display, and deliver relevant and timely communication, suggestions, and content to and from a user. The information service may be used to directly interact and implement aspects of a workflow with a subject human user or patient, while also facilitating interaction with other humans or agents, such as friends, family, experts, professionals, and the like.

The workflows may integrate with various evaluations that dynamically assess a user's current state. For example, user interaction from a series of evaluations may be collected to monitor and measure a user's health, location, time and date, other persons nearby, etc., to facilitate real-time, interaction with the user.

The dynamic workflows and the various interaction applications of the assistive technology device as described by the present disclosure may be configured for receipt, processing, and delivery of relevant content from an electronic information system. The information system, as further described herein, may implement human interaction with a series of workflows and processing activities that deliver relevant content to encourage human activity and progress towards an ultimate goal. Relevant content may be provided in a push or pull manner, on schedule or in response to determined conditions, and manually or automatically from the information system, in accordance with the following techniques.

In one or more embodiments, the experience for a user of a computing device of the present invention may be significantly enhanced by operating the computing device in a way that is context dependent. The context, and hence a desired operation of the computing device, may be determined based on the location of the computing device and actions from which intent of the user may be inferred. Such operation may be achieved with a computing device that can sense its position relative to locations that have been designated as being associated with a desired configuration of the computing device. For example, a computing device whose location is in a bedroom may automatically configure itself as an alarm clock or bring up menus for sleep/wake activities. In some embodiments, the context of a computing device may be determined by reading values from tags using a proximity-based radio. The tags may be passive tags, responding the radiation emitted by the computing device.

A context-sensitive user interface input may be provided. Consistent with embodiments of the present invention, a user interface element comprising text input may be provided as part of an application user interface (UI). The UI element may comprise graphical assistance presented to a user as they type to aid in building an application action. The UI element may provide context-sensitive suggestions; that is, given what the element knows about the user's context (e.g. an application focus such as a calendar or an email function and what the user has typed already), the control may offer different options and/or suggestions as to what the user may enter next.

The user interface control may comprise a text-box in which the user may type actions. Actions may comprise "sentences" that may follow a grammar defined by the application. As the user enters "token" (words) and builds the action, a graphical user interface may follow the text caret and may provide suggestions on tokens that may be typed next and/or selected to continue to build the action. Once the user is done, a completed executable action may be sent to the application for processing.

The contextual application may monitor other applications installed on device for context information at a predetermined context. In some example embodiments, the predetermined context may be a specific application or applications. In other example embodiments, the predetermined context may refer to a specific field or fields within one or more applications. In still other example embodiments, the predetermined context may be a specified graphical interface screen or screen (i.e., page or pages) within one or more application. In yet other example embodiments, the predetermined context may be certain information or data automatically provided by a system service, such as a location from a global positioning system service; a date from a calendar service; or a time from a clock service.

Contextual information can be used for a wide variety of applications and can generally be characterized as information that is relevant to an understanding of something. For example, traditionally, context includes information about a location and its surrounding environment, the identity of things named in a text such as people, places, books, and so on. However, other types of information promise to be of as much or even greater benefit for next-generation communication services. Using context information, an application may search and provide results from other applications that are relevant to the context information. The application may receive contextual information when the user of the device is interacting with one or more specified applications, and retrieve content from the application being accessed when such application meets a set of criteria or predetermined context.

The contextual application may be any application or another computer program installed on the assistive technology system which is executable by a processor and can be stored on a computer-readable media. In some example embodiments, the contextual application may refer to firmware and/or a combination of software and firmware. In some other example embodiments, the contextual application may be executed on the web or over a network. The contextual application may process, organize, manipulate, store, generate, display, and/or otherwise render context information that can be used by the contextual application to retrieve content from other applications.

In one or more embodiments, the contextual application may be configured to monitor all applications running on assistive technology system. When a user interaction occurs for any application running on assistive technology system, contextual application may be notified. Contextual application may then determine whether the application with which the interaction occurs is identified in a defined configuration. In some other example aspects, contextual application may be configured to monitor only specific applications such as, for example, a Contacts application, for interaction by a user of assistive technology system.

Contextual application may include one or more settings that allow a manufacturer, service provider and/or user of assistive technology system to set which of the other applications installed on assistive technology system will be monitored and to configure the predetermined context for the applications to be monitored. In some alternative example embodiments, a manufacturer, service provider and/or administrator of contextual application may configure the contextual settings and/or the predetermined context.

In one or more embodiments, the contextual application may be configured to monitor or detect applications for a particular event occurring in the assistive technology system. An event may be any event performed as a result of user interaction with assistive technology system, any event performed as a result of sensors such as RFID, GPS, facial recognition, voice recognisiton, time/date, etc. In some example embodiments, events may refer to events triggered by device sensors or system services, such as, for example, location services, accessibility helper services, or date and time services.

User interactions may refer to an event within the assistive technology system wherein the user accesses certain applications such that a window of a contacts list application is displayed in the user interface of the assistive technology system . Once context information is set and/or retrieved, the context information may be utilized by one or more contextual applications to retrieve content related to the context information from one or more applications.

In one example embodiment, contextual applications may run in the background while another application is being accessed such that when a user accesses and interacts with an application, the contextual application may retrieve the context information without user intervention and/or unobtrusively from an application and utilize the retrieved context information to search for content from any applications.

In one or more embodiments, the contextual application may be configured for utilization of the context-sensitive user interface element where text input may be provided as part of an application user interface (UI) with or without the assistive technology system . For example, a person may temporary or permenant mental disabilities such as a geriatric patient or people with Alzheimer's disease or dementia in general where the user can make use of the contextually-sensitive user interface element to present a heirarical system of panels for a user experience that guides the patient or user through the course of the day. For example, the system gathers context about the user's environment and adjusts the communication options based on this context.

Further, it is understood that any number of panels may present information in a paged manner. By "paging" and as used herein, it is meant an approach for taking a large or substantial list of items and segmenting them such that in a network perspective, data and/or information may be presented in a quick and efficient manner. By incorporating paging in the display, any number of the panels will only transmit a portion of the data across the network, which in turn may reduce data transfer costs and reduce delays due to this data transfer. It will be understood that one example of paging is infinite scrolling, whereby presented information automatically pages subsequent segmented information upon scrolling to the end of the currently presented page.

Context for custom communication panels can be gathered through automatic queries to an AI device or through other sensor systems. Context could be time-of-day, persons in proximity of the user, temperature, day of the week, calendar entries, medical data or sensor input, or any other input that would change what the user may want to say or do. A communication panel appears for the user on his computer (device) offering these customized choices. This could be in the form of a list or an array of buttons and includes third-party context, which brings up certain pre-made panels of items depending on a person present (or mentioned). A context generated button appears for "How was school", for example, if it is 4:00 pm on a weekday and the school-age daughter walks into the room. Context generated button "Can you take me outside?" appears, for example, if the caregiver is in the room in the afternoon and the current weather is sunny with no chance of rain.

In some example aspects, such as where an application has multiple user interfaces or pages, a specific interface from where information can be retrieved may be set in the defined configuration of contextual application. In such example aspects, determining if the event meets the defined configuration may include verifying that the user interface or page currently being accessed by a user (i.e., the "active" interface or page) is the user interface of the application specifically defined as a predetermined context.

In some example aspects, contextual application may also provide a notification to the device user regarding the identification or availability of results of the search for content related to the context information. In some example embodiments, the providing of notification to the user may be performed in unobtrusive manner using a notification layer in assistive technology system. In other example embodiments, the notifications may be message sent via text or e-mail. Other unobtrusive methods of providing notification to the user while the user is accessing application will be known in the art. In some alternative example embodiments, a mobile device, such as a smart watch, may be communicatively connected to an assistive technology system. In such example embodiments, notifications of search results may be sent to the second mobile device. Such notifications may occur through text or e-mail messages, vibrations, lights, background changes or other known methods.

In one or more embodiments, the present invention provides systems and methods for implementing an interaction model with the user in order to interact with data of any data source in a natural way. In some examples, the system receives natural language input from the user and processes the input using multiple technologies such as keyword mapping, fuzzy logic, context-sensitivity and historical search data.

In one or more embodiments, the present invention provides systems and methods for data retrieval using an interactive, dynamic model that enables a self-learning and context-sensitive semantic layer to allow a user to retrieve and report data in a natural way from one or more data sources. Instead of pushing the user into a pre-defined or static model thereby allowing the user access to only a pre-defined set of questions and data reporting, the system allows the user to explore data in a manner similar to a conversation, e.g., starting on a broad level and then detailing into specific areas that he/she is attempting to locate.

In one or more embodiments, the assistive technology system is configured to learn on multiple levels as the user uses the system more. In one or more embodiments, if the assistive technology system does not understand how a keyword is mapped to an existing data structure (e.g., how it is mapped to a data entry or table name of the data sources), the assistive technology system provides an interactive object that receives information about the keyword from the user.

In one or more embodiments, one or more context-sensitive main communication panel modules are disclosed that are configured to connect one or more front-end systems, such as one or more digital assistants, to one or more back-end systems that are deployed in a user environment. A digital assistant, also referred to as a virtual assistant or chatbot, is a software agent that is configurable to perform tasks for a user. Examples of digital assistants include Apple Siri, Google Assistant, Amazon Alexa, and Microsoft Cortana. Digital assistants typically interact with users via one or more of text (e.g., online chat, such an instant message application), voice, image, or video inputs or outputs. Digital assistants use natural language processing (NLP) to match user inputs to user intents. Many digital assistants use artificial intelligence techniques, including machine learning, to improve their matching performance. Digital assistants are typically activated using a wake word (e.g., "Alexa" for Amazon ALEXA or "OK Google" for Google ASSISTANT).

In one or more embodiments, the one or more context-sensitive main communication panel modules include a module that is configured to infer at least one of an intent, context, or classification from a command received at the one or more front-end systems, a learning module that is configured to generate one or more requests (e.g., distribute one or more commands to the one or more back-end systems), receive one or more responses to the one or more requests, format the responses according to one or more machine-learned presentation rules, and generate insights for use in future command processing, and a looking module that is configured to generate the one or more responses to the one or more requests (e.g., by executing the one or more commands, such as commands for querying or scraping data sources associated with the back-end system and/or data sources external to the one or more back-end systems, such as external public data sources). In one or more embodiments, the output of the responses is through one or more connected front-end systems, such as one or more digital assistants.

In example embodiments, learning modules employ machine-learning techniques to learn workflows associated with each user environment, including user-specific vocabularies that are used for purposes of determining intent, context, and classification of a command received from the front-end systems, and mapping of commands received from the one or more front-end systems to the machine-learned user workflows. Based on a machined-learned mapping of the query to a machine-learned pathway into one or more of the back-end systems deployed, as discussed above, the learning module automatically submits one or more requests to one or more back-end systems deployed on behalf of the user.

In one or more embodiments, a server can be a key hub for communications with a variety of people, resources, assets, applications, and data sources that may have relevance to the user. As shown, the data sources may include a database of support network data (e.g., location, schedule, specialties, etc.) and a database of third-party app data and interfaces (e.g., social media, local search, navigation, etc.) and affinity programs. The data sources may also include data sources accessible over a network (e.g., local network, public network, private network, internet, IOT, etc.) such as a database of user data (e.g., medical, professional, public records, media, etc.), a database of local user data (e.g., police reports, trends, etc.) and a database of local data feeds (e.g., events, traffic, news, weather, camera feeds, etc.). Additional data sources may include user data sources including user data and analytics, including predictive analytics data, etc. The user data and analytics may include database(s) and engine(s), action/response engine, interface coordination database(s) and engine(s) assessment/prediction, learning database(s) and engine(s), (trending) context and behavior inference database(s) and engine(s), user profile, support network, schedule/calendar, devices/vehicles, user usage, hobbies, media posts, behavioral data, location/context profiles, historical location/context data, locations, places of interests (POIs) suppliers, user medical, personal data, and administration, security, and verification.

Not all aspects of the present disclosure need to be centralized in the server. The user's local device(s) may also have functionality as disclosed herein, both for Peer-to-Peer, IoT, Mesh, ZigBee, LPWAN, Star, Client/Server, and/or machine-to-machine (M2M) networking, situations and in circumstances where the server or other parts of the present disclosure are not operating or accessible. An example of this functionality is in the device on/in/around the user detecting a high-risk situation and the user attempting to enter and drive a car in an underground garage (thereby preventing a GPS locate).

Numerous communication methods to/from the user and other resources are used in various embodiments of the present disclosure. These can include (but are not limited to) text/SMS/MMS, voice calls, email, social media, video, peer-to-peer and machine-to-machine communications, instant messaging, voice messaging/mail, 3rd party applications, heads-up displays (such as Google GLASS), hologram projections, and other applicable voice and data methods and mediums.

As discussed before, interfaces with third party applications may be provided in various embodiments. In various embodiments, a wide variety of interfaces may be provided to interact with the user, support network, and third parties. Such interfaces include but are not limited to: Direct manipulation interface (e.g. augmented/virtual reality), Graphical user interfaces, Web-based user interfaces, Touchscreens, Command line interfaces (e.g., command string input), Touch user interfaces, Hardware interfaces (e.g. knobs, buttons), Attentive user interfaces (e.g., that determine when to interrupt a person), Batch interfaces, Conversational interfaces, Conversational interface agents (e.g. animated person, robot, dancing paper clip), Crossing-based interfaces (e.g., crossing boundaries versus pointing), Gesture interfaces (e.g. hand gestures, etc.), Holographic user interfaces, Intelligent user interfaces (e.g., human to machine and vice versa), Motion tracking interfaces, Multi-screen interfaces, Non-command user interfaces (e.g., infer user attention), Object-oriented user interfaces (e.g., to manipulate simulated objects), Reflexive user interfaces (e.g., achieves system changes), Search interface, Tangible user interfaces (e.g., touch), Task-focused interfaces (e.g., focused on tasks, not files), Text-based user interfaces, Voice user interfaces, Natural-language interfaces. Zero-input (e.g., sensor-based) interfaces, zooming (e.g., varying-levels of scale) user interfaces. Various mechanisms may be provided for selecting/modifying the interfaces based on the user's context. In various embodiments, robots and robotics may be used. In various embodiments, scheduling and to-do lists of the user are utilized, as well as the user's support network.

The approaches described herein provide users with a way to view and organize content by providing a classic hierarchical visualization structure in various computing environments, for example desktop and mobile environments. In some approaches, the user may rearrange the navigation hierarchy based on the provided content, further enhancing the context-sensitive nature of the navigation.

In one or more embodiments, a display apparatus is provided having an interface with an input and an output and a processor coupled to the interface. The output is configured to display a first panel at a variable or changeable panel display portion of a display. The first panel includes one or more first selectable nodes associated with a control system and information associated with the control system.

Upon the input receiving a selection of one or more of the selectable nodes, the processor is configured to access a server and present a panel associated with the selected node at the variable panel display portion. This panel includes one or more second selectable nodes and information associated with the selected node. The processor is further configured to adjust the size of the variable panel display portion displayed at the output to accommodate a number of panels and to allow navigation between the panels that is independent of information displayed at a working portion of the display. In some examples, the processor is further configured to present the first panel and the panel associated with the selected node adjacent to each other on the variable display portion via the output.

In one or more embodiments, the display apparatus may further include any number of additional panels which are configured to display the selected node and information associated therewith. The processor may be configured to determine the size of the variable panel display portion corresponding to a maximum number of displayable panels in the variable panel display portion and compare the determined size to the number of presented panels and thereafter display the maximum number of displayable panels in the variable panel display portion.

Approaches are provided that allow for efficiently visualizing hierarchical data structures across a number of different devices having displays. In one aspect, the approaches allow for the resizing of the hierarchical structure to accommodate displays having a number of different configurations. The hierarchical structure may also be navigated while a working portion of the display maintains the content contained therein via a graphical user interface (or in some instances, an audio cue). The hierarchical structure may provide an indication for the current visible panels and may be navigable to allow the display of alternative panels. The hierarchical structure may also include contextual information (such as, for example, a folder name, title, or other common identifier) beyond identification information.

All of the above disclosed concepts/principles/heuristics/techniques/algorithms, etc. can be used in variety of different fields and applications. Some of the examples are Augmentative and alternative communication (AAC), Assistive Technology, Speech Generation Devices, Augmented/Mixed/Virtual Reality, Desktop & Mobile Computing, Gaming, Industrial Control, Healthcare, Defense, Aviation, Transportation, Manufacturing, Product Lifecycle Management, Aerospace, & others. All the concepts/principles/heuristics/techniques/algorithms, etc. disclosed in this document can also be used with all the apparatuses/devices disclosed in the referenced documents, as well as with devices including but not limited to head worn devices such as smart glasses, smart helmets, virtual/mixed/augmented reality devices, head worn controllers, in-ear controllers, headphones, ear plugs, head bands and neck bands. Further, they are also applicable to other body worn devices such arm/wrist bands, devices utilizing wearable sensors and smart watches, devices embedded inside the user's body, as well as devices that are not physically worn in/on user's body such as smart phones, tablets, desktop computers, smart TVs, set top devices, and others that may possibly utilize image, radar, sonar, sound/voice, ultrasonic, laser and other sensors to sense any or all body action and/or physiological states.

While the disclosure has been described with reference to exemplary embodiments, it will be understood by those skilled in the art that various changes may be made, and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure is not limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The description of the present disclosure has been presented for purposes of illustration and description but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A system comprising:
one or more switches configured to be activated by a user, each switch comprises a set of user input devices configured to detect a signal from the user;
a controller that detects a volitional user input corresponding to an increase in a particular input signal detected by a particular one of the one or more switches;
a user interface device; and
a controller communicatively coupled to the one or more switches, the user interface device, and a switch-controlled device, and which:
presents a configuration user interface on the user interface device including selectable configurations for access modes;
assigns one or more of the switches with respect to one or more user inputs according to a current selected configuration of an access mode; and
detects a volitional user input corresponding to a change in a particular input signal detected by a particular signal producing input user device;
identifies an assigned user input based on the current selected configuration and the detected volitional user input of the particular user input device signal; and
communicates the user input to the switch-controlled device.

2. The system of claim 1, wherein the access mode comprises a first input of a first duration and a second input of a second duration of a first switch-controlled device, the first and the second durations being different.

3. The system of claim 1, wherein the access mode comprises selecting one of: (i) a time scan; and (ii) a step scan.

4. The system of claim 1, wherein the access mode comprises assigning a first switch-controlled device to a first input of a user interface and assigning a second switch-controlled device to a second input of the switch-controlled device.

5. The system of claim 1, wherein the access mode comprises:
a button quantity selection of one or more buttons; and
wherein the access mode maps or assigns an input signal or input trigger to the controller to one or more buttons corresponding to the button quantity selection on a panel-by-panel basis;
wherein the one or more buttons are mapped independently to one or more controller outputs; and
wherein the input signal or input trigger is producible as an output signal by the one or more controller outputs.

6. The system of claim 5, wherein the controller:
determines that a first user input is received in response to detecting the first volitional user input to a particular switch having a first duration; and
determines that a second user input is received in response to detecting a second volitional user input to the particular switch having a second duration that is longer than the first duration.

7. A method comprising:
presenting a configuration user interface on a user interface device including selectable configurations for access modes;
assigning one or more of the switches as respective to one or more user inputs according to a current selected configuration of an access mode, each switch configured to be positioned on a user and comprising a set of signal user input device configured to detect a signal from the user; and
detecting a volitional user input corresponding to a change in a particular signal detected by a particular signal user input device;
identifying the user input based on the current selected configuration and the detected volitional user input of the particular signal user input device; and
communicating the user input to the switch-controlled device.

8. The method of claim 7, wherein the access mode comprises a first input of a first duration and a second input of a second duration of a first switch-controlled device, the first and the second durations being different.

9. The method of claim 7, wherein the access mode comprises selecting one of: (i) a time scan; and (ii) a step scan.

10. The method of claim 7, wherein further comprising assigning a first switch-controlled device to a first input of a user interface and assigning a second switch-controlled device to a second input of the switch-controlled device.

11. The method of claim 7, further comprising:
receiving a button quantity selection of one of one or more buttons; and
mapping or assigning one or more unique input signal or input trigger to the controller to one or more buttons corresponding to the button quantity selection on a panel-by-panel basis;
wherein the one or more buttons are mapped independently to one or more controller outputs; and
wherein the input signal or input trigger is producible as an output signal by the one or more controller outputs.

12. The method of claim 11, further comprising:
determining that a first user input is received in response to detecting the first volitional user input to a particular switch having a first duration; and
determining that a second user input is received in response to detecting a second volitional user input to the particular switch having a second duration that is longer than the first duration.

13. A computer program product comprising:
a computer readable storage device; and
program code on the computer readable storage device that when executed by a processor associated with an electronic device, the program code enables the electronic device to provide functionality of:
presenting a configuration user interface on a user interface device including selectable configurations for access modes;
assigning one or more of the switches as respective to one or more user inputs according to a current selected configuration of an access mode, each switch configured to be positioned on a user and comprising a set of signal user input devices configured to detect a signal from the user; and
detecting a volitional user input corresponding to a change in a particular signal detected by a particular signal user input device;
identifying the user input based on the current selected configuration and the detected volitional user input of the particular signal user input device; and
communicating the user input to the switch-controlled device.

14. The computer program product of claim 13, wherein the access mode comprises a first input of a first duration and a second input of a second duration of a first switch-controlled device, the first and the second durations being different.

15. The method of claim 13, wherein the access mode comprises selecting one of: (i) a time scan; and (ii) a step scan.

16. The computer program product of claim 13, wherein the program code enables the electronic device to provide the functionality of assigning a first switch-controlled device to a first input of a user interface and assigning a second switch-controlled device to a second input of the switch-controlled device.

17. The computer program product of claim 13, wherein the program code enables the electronic device to provide the functionality of:

receiving a button quantity selection of one of one or more buttons; and mapping or assigning one or more unique input signal or input trigger to the controller to one or more buttons corresponding to the button quantity selection on a panel-by-panel basis;

wherein the one or more buttons are mapped independently to one or more controller outputs; and wherein the input signal or input trigger is producible as an output signal by the one or more controller outputs.

18. The computer program product of claim 13, wherein the program code enables the electronic device to provide the functionality of:

determining that a first user input is received in response to detecting the first volitional user input to a particular switch having a first duration; and determining that a second user input is received in response to detecting a second volitional user input to the particular switch having a second duration that is longer than the first duration.

\* \* \* \* \*